(12) United States Patent
West et al.

(10) Patent No.: US 10,309,690 B2
(45) Date of Patent: Jun. 4, 2019

(54) DISCRETE ATTACHMENT POINT APPARATUS AND SYSTEM FOR PHOTOVOLTAIC ARRAYS

(71) Applicant: SolarCity Corporation, San Mateo, CA (US)

(72) Inventors: Jack Raymond West, San Rafael, CA (US); David Youmans, San Rafael, CA (US); Brian Atchley, Petaluma, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 15/866,116

(22) Filed: Jan. 9, 2018

(65) Prior Publication Data

US 2018/0224159 A1 Aug. 9, 2018

Related U.S. Application Data

(60) Division of application No. 13/402,860, filed on Feb. 22, 2012, now Pat. No. 9,863,665, which is a continuation of application No. 13/325,054, filed on Dec. 13, 2011, now abandoned.

(60) Provisional application No. 61/445,044, filed on Feb. 22, 2011.

(51) Int. Cl.
| | |
|---|---|
| *F24S 25/33* | (2018.01) |
| *F24S 25/65* | (2018.01) |
| *F24S 25/70* | (2018.01) |
| *F24S 25/613* | (2018.01) |
| *F24S 25/632* | (2018.01) |
| *F24S 25/636* | (2018.01) |
| *H02S 20/23* | (2014.01) |
| *F24S 25/00* | (2018.01) |

(52) U.S. Cl.
CPC ............... *F24S 25/70* (2018.05); *F24S 25/33* (2018.05); *F24S 25/613* (2018.05); *F24S 25/632* (2018.05); *F24S 25/636* (2018.05); *F24S 25/65* (2018.05); *H02S 20/23* (2014.12); *F24S 2025/801* (2018.05); *F24S 2025/807* (2018.05); *Y02B 10/12* (2013.01); *Y02B 10/20* (2013.01); *Y02E 10/47* (2013.01); *Y10T 403/32975* (2015.01); *Y10T 403/38* (2015.01)

(58) Field of Classification Search
CPC .. E04C 1/34; E04B 7/022; E04B 7/026; F24J 2/0422; F24J 2/52; F24J 2/5243; F24J 2/4669; F24J 2/4658; F24J 2/045; F24J 2/5252; F24J 2/5245; F24J 2002/4663; F24J 2002/4667
See application file for complete search history.

*Primary Examiner* — Phi D A
(74) *Attorney, Agent, or Firm* — Kilpatrick Townsend & Stockton LLP

(57) ABSTRACT

An attachment point apparatus and system for photovoltaic arrays is disclosed. One embodiment provides a rail system for receiving a PV module, including a first rail, a second rail, a substantially rectilinear double male connector adapted for coupling an end of the first rail to an end of the second rail, and a connector adapted to attach a PV module to the first rail. Another embodiment provides a PV module including a PV laminate, a frame integral with and supporting the PV laminate, and a spanner bar adapted to solely span a width of the PV module, orthogonally connect at various locations along the frame, and attach to a support structure. A further embodiment provides a coupling device for a PV module comprising a first coupling portion adapted to rotatably engage a PV module, and a second coupling portion adapted to rotatably engage a rail.

20 Claims, 38 Drawing Sheets

FIG. 33

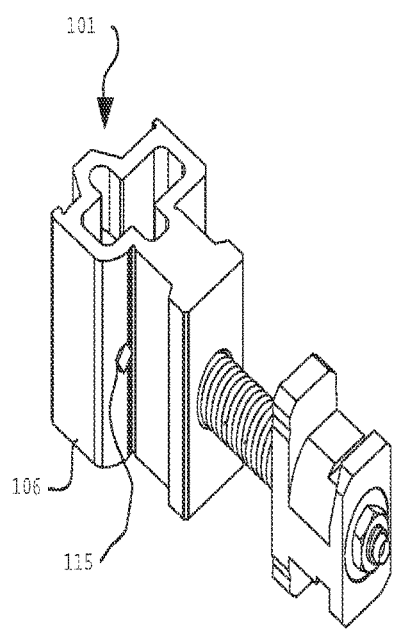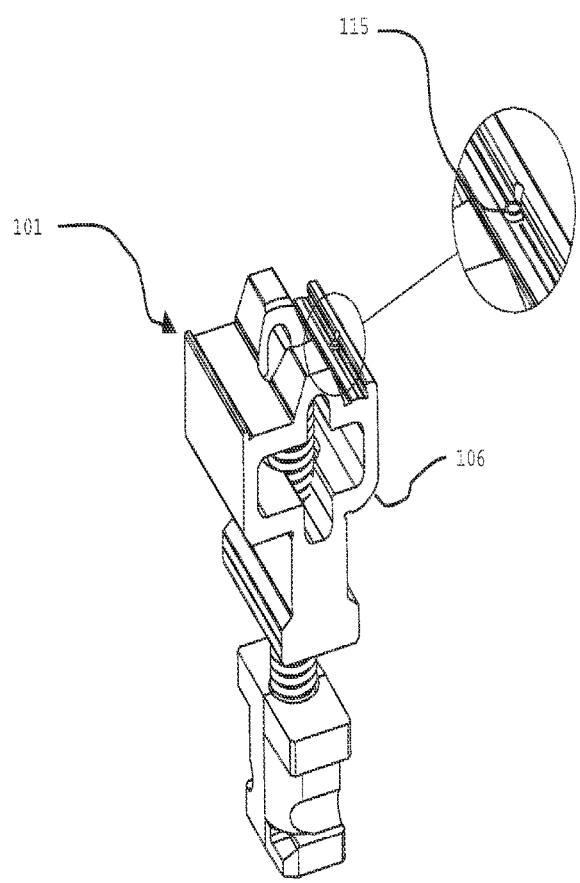
FIG. 6A
FIG. 6B

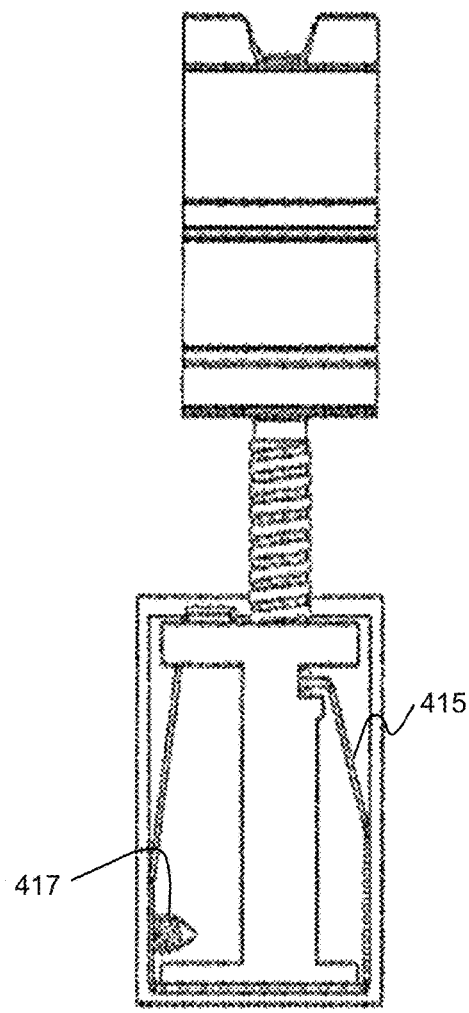
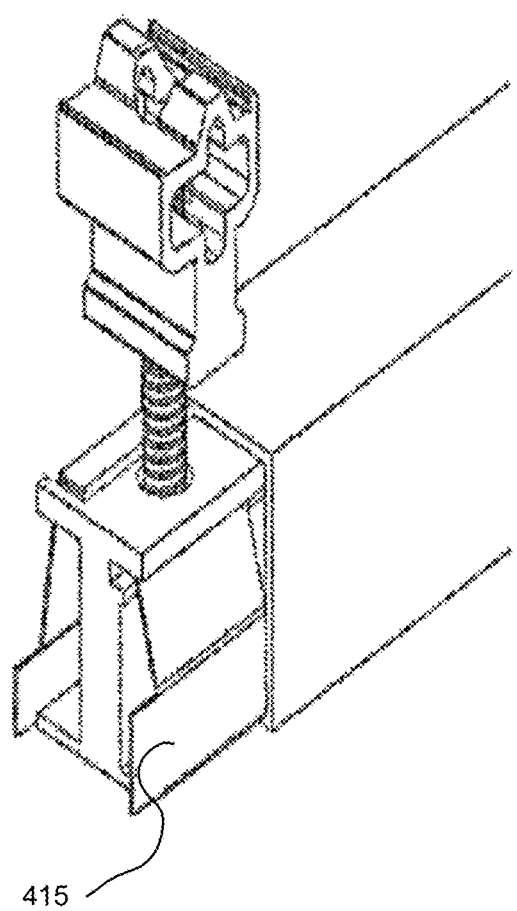
FIG. 37                    FIG. 36

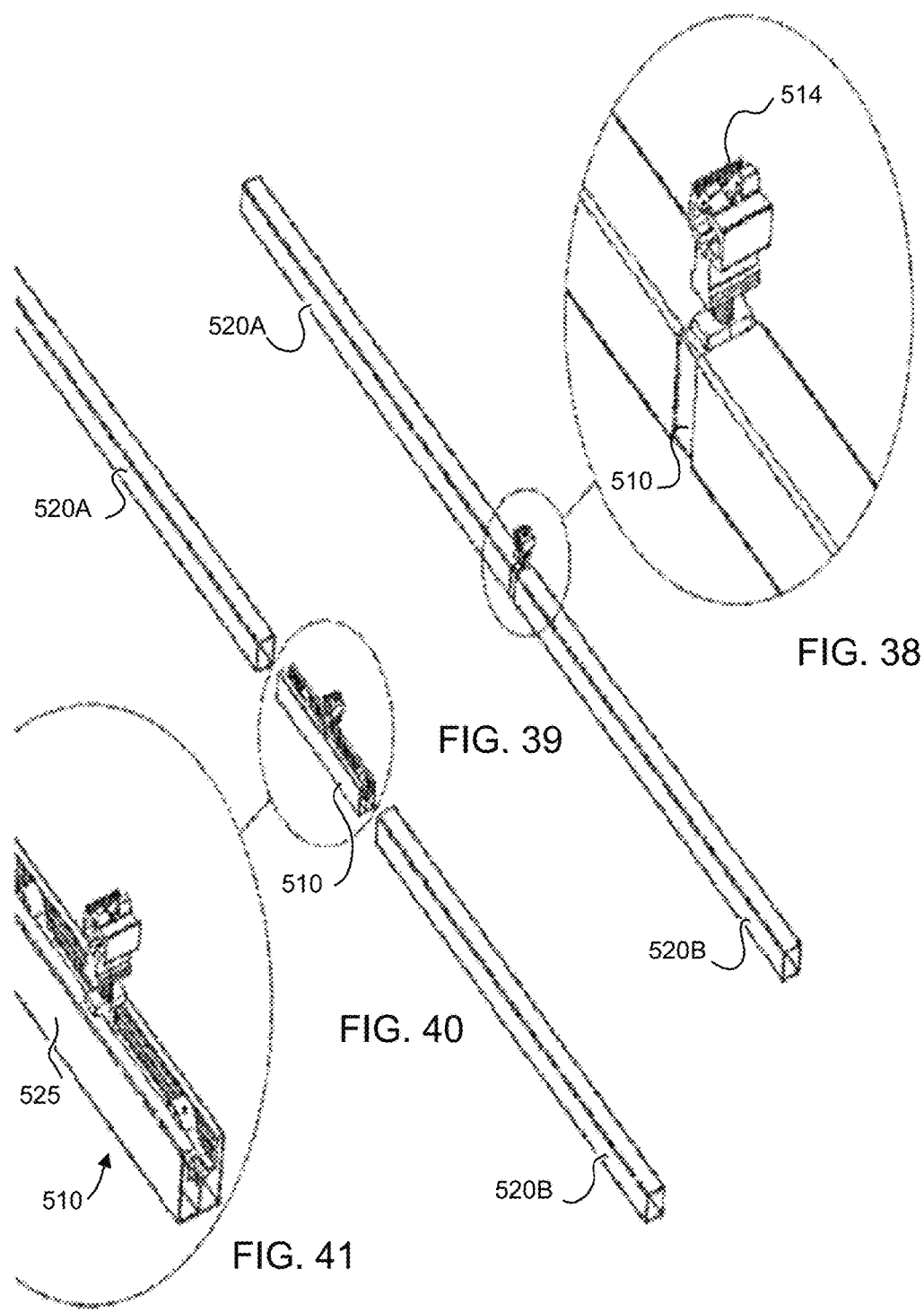

DISCRETE ATTACHMENT POINT APPARATUS AND SYSTEM FOR PHOTOVOLTAIC ARRAYS

CROSS-REFERENCES TO RELATED APPLICATIONS

The present application is a divisional of U.S. application Ser. No. 13/402,860, filed Feb. 22, 2012, which is a continuation of U.S. application Ser. No. 13/325,054, filed Dec. 13, 2011, and claims the benefit of the filing date of U.S. Provisional Patent Application Ser. No. 61/445,044, filed Feb. 22, 2011. The foregoing applications are incorporated by reference in their entirety as if fully set forth herein.

BACKGROUND OF THE INVENTION

Many photovoltaic (PV) arrays are mounted on structures that require discrete attachment points. For example, tile and slate roofs and various types of ground mounted structures may include a support structure for a PV array that requires attachment of the PV array to the structure at discrete locations in one of or both the x and y axes of a PV array mounting plane. In the case of tile roofs, this may be due to the difficulty of installing an attachment device at anywhere other than a specific place relative to the tile. For example, some tile products may only allow an attachment device to be installed within a small range of the overall reveal (length showing) of the tile and the underlying roof may require attachment to the rafters, which typically runs on a discrete schedule. Thus, locations for mounting along the y-axis may be restricted as by the tile and locations for mounting along the x-axis may be restricted as by the locations of the rafters. Ground mount structures may also require discrete attachment points in the x and/or y axes as may be due to fixed locations of the structural members and/or the need to line up the structural members with specific locations on the PV module.

Some attempts have been made to address the need for discrete attachment point mounting systems. Most utilize long rails to span between discrete attachment points, thereby freeing up the x and/or y axes. The rails may be connected directly to the PV module frame as by a compression clamp. The rails may be connected to the support structure below as by means of an attachment device such as a tile hook, standoff, hanger bolt, false tile, or mounting foot.

Such conventional systems suffer from a number of drawbacks. The long rails utilized, which can be often 10-20 feet long, may be difficult to warehouse, ship, and move onto a roof, or other support surface. These rails may also limit mounting options on complicated roofs which may have numerous smaller roof surfaces and/or numerous obstructions (such as vent pipes, chimneys, and so on) since rails may need to be cut on site, potentially wasting time and materials. Since rafters typically run in the direction from ridge to gutter, conventional long rail systems may be less cost-effective if the PV modules are oriented in "landscape" as opposed to "portrait" manner, since rails parallel to the rafters may require more total rail length or be prohibited, as by the PV module manufacturer or local building codes.

The mounting technology used to connect PV modules to these described long rails may also be cumbersome and time-consuming due to large numbers of small parts, including fasteners. The attachment devices utilized may also be expensive and time-consuming to install. Such conventional systems may further suffer from a lack of adaptability to uneven roof surfaces as well as time-consuming and unreliable grounding hardware. There may also be very little integration with other required equipment in the overall PV system, such as electrical junction and combiner boxes, wire management devices, and other equipment.

Prior discrete attachment point systems may frequently require more attachment devices than needed for acceptable structural performance of the system. For example, typical tile roof mounting systems, which may not interconnect the rows, may require two rows of rails per row of PV modules. This constraint may limit the ability of a system designer to optimize the structural support system so that the level of support provided is substantially matched to the level of support required, based on various site conditions such as wind, snow, roof structure, and so on. Lack of structural optimization could waste a significant quantity of materials relative to a more optimized approach.

The foregoing examples of the related art and limitations related therewith are intended to be illustrative and not exclusive. Other limitations of the related art will become apparent to those of skill in the art upon a reading of the specification and a study of the figures.

BRIEF SUMMARY OF THE INVENTION

A discrete attachment point apparatus and system for photovoltaic arrays is disclosed. The following embodiments and aspects thereof are described and illustrated in conjunction with systems, apparatus, tools, and methods which are meant to be exemplary and illustrative, not limiting in scope. In various embodiments, one or more of the above-described problems have been reduced or eliminated, while other embodiments are directed to other advantages or improvements.

One embodiment provides a rail system for receiving a PV module, including a first rail, a second rail, a substantially rectilinear double male connector adapted for coupling an end of the first rail to an end of the second rail, and a connector adapted to attach a PV module to the first rail. Another embodiment provides a PV module including a PV laminate, a frame integral with and supporting the PV laminate, and a spanner bar adapted to solely span a width of the PV module, orthogonally connect at various locations along the frame, and attach to a support structure. A further embodiment provides a PV module including a PV laminate, a frame integral with and supporting the PV laminate, and a spanner bar adapted to orthogonally connect to various locations along the frame, and to attach to a support structure, wherein a length of the spanner bar is substantially an integer multiple of a width of the PV module. Another embodiment provides a coupling device for a PV module comprising a first coupling portion adapted to rotatably engage a PV module, and a second coupling portion adapted to rotatably engage a rail. A further embodiment provides a PV module including a PV laminate, a frame integral with and supporting the PV laminate, and a coupling device, wherein the coupling device comprises an upper engaging portion adapted to rotatably engage the frame and a lower engaging portion adapted to rotatably engage a rail.

In addition to the exemplary aspects and embodiments described above, further aspects and embodiments will become apparent by reference to the figures and by study of the following detailed descriptions.

BRIEF DESCRIPTION OF THE DRAWINGS

Demonstrative embodiments are illustrated in referenced figures and drawings. It is intended that the embodiments and figures disclosed herein are to be considered illustrative rather than restrictive.

FIG. 6A and FIG. 6B is a perspective view of a cam foot.

FIG. 36 is a perspective view of a portion of a spanner bar and a coupling.

FIG. 37 is a side view of FIG. 36.

FIG. 38 is am enlargement of a section of FIG. 39.

FIG. 39 is a perspective view of two spanner bars and a coupling.

FIG. 40 is a perspective view of two spanner bars and a coupling.

FIG. 41 is an enlargement of a portion of FIG. 40.

DETAILED DESCRIPTION OF THE INVENTION

Figure 1A:
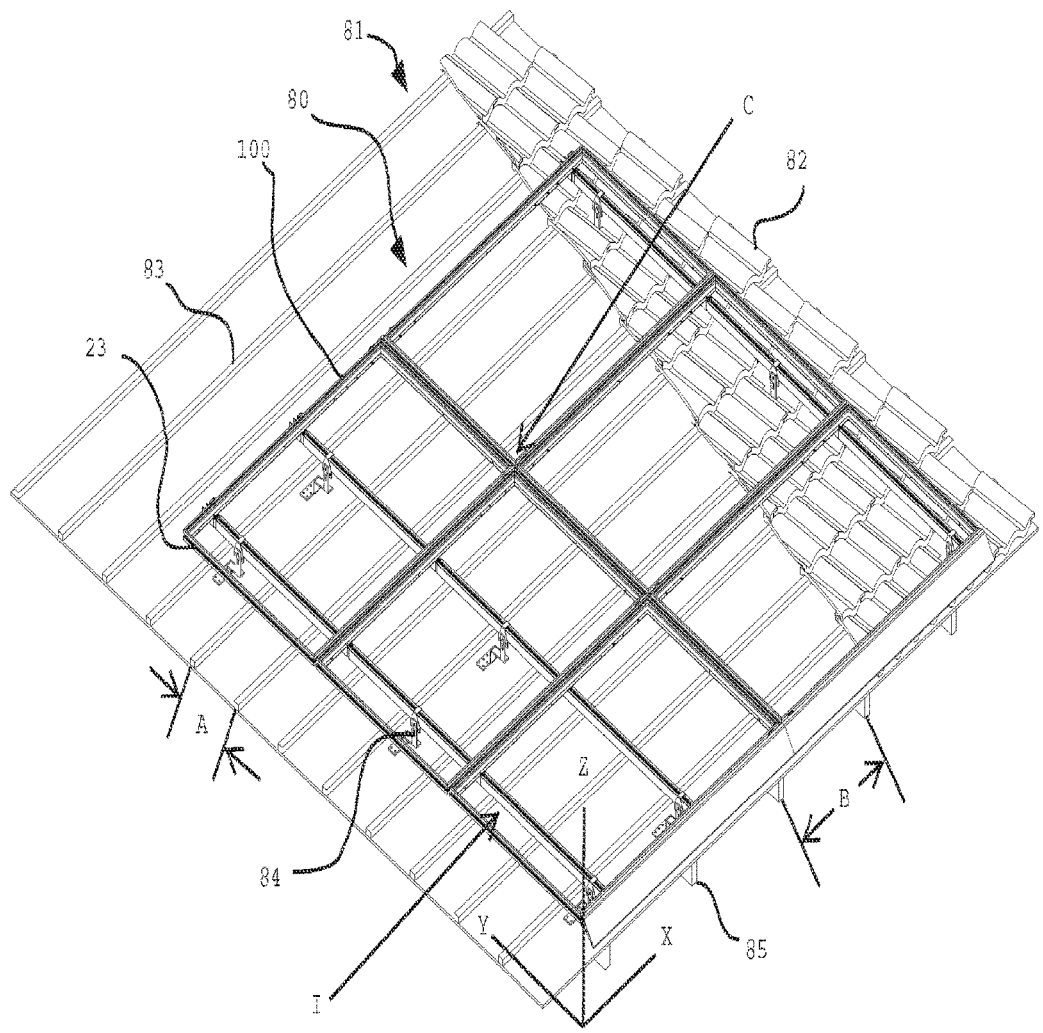
FIG. 1A shows a perspective view of a PV array on a roof.
Figure 20:
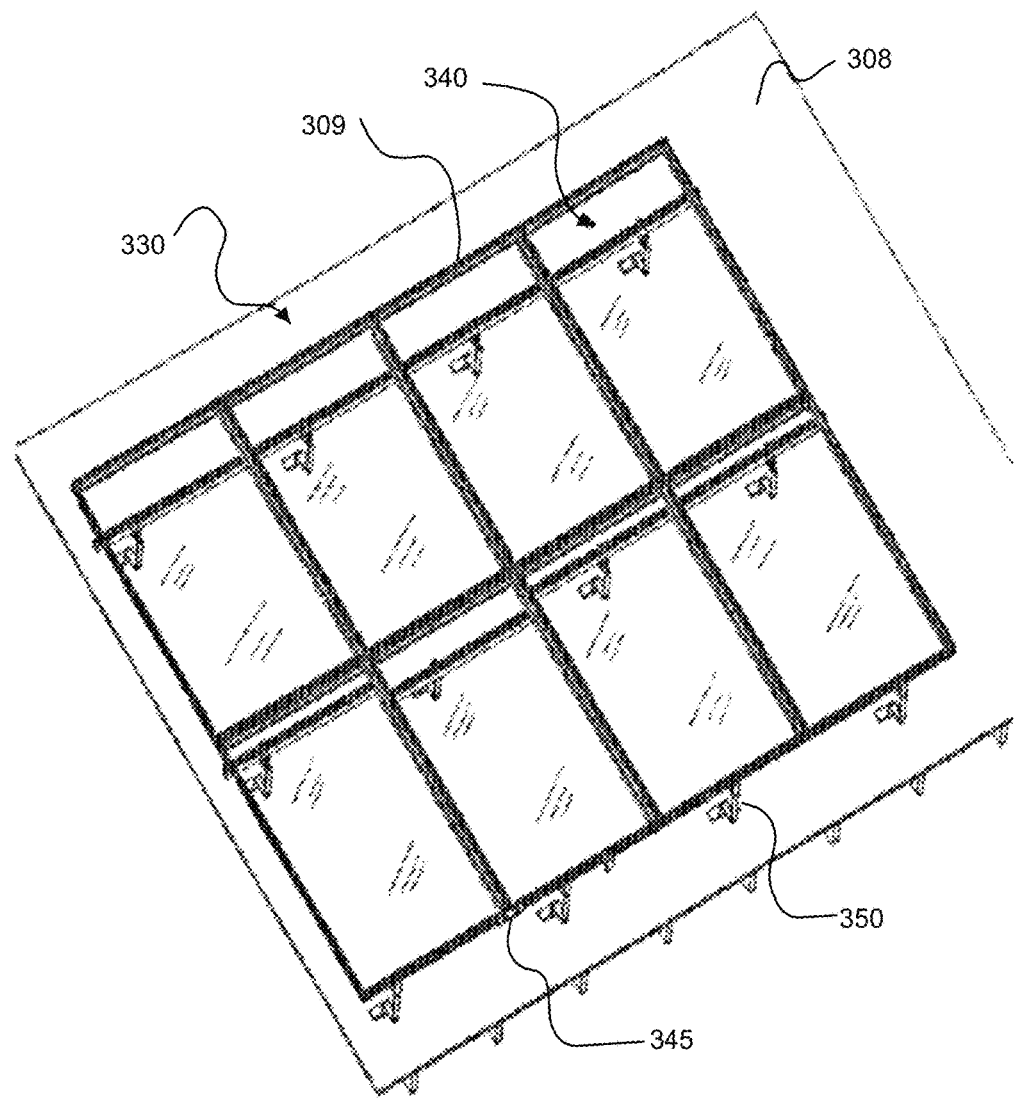
FIG. 20 is a perspective view of a PV array with spanner bars and tile hooks.

Terms. With reference to the figure and description herein:

Adjacent refers to being positioned next to or adjoining or neighboring, or having a common vertex or common side. Thus, adjacent PV panels would include PV panels that have one side close to (from a few inches apart to abutting) and facing one side of another PV panel, such as shown in FIGS. 1a and 20. Sometimes, but not always, the corners of adjacent panels align; so four adjacent panels would have one corner each that nearly or actually touch the other three corners, such as exemplified at Point C in FIGS. 1a and 20, and its descriptions.

Attach or attachment refers to one or more items, mechanisms, objects, things, structures or the like which are joined, fastened, secured, affixed or connected to another item, or the like in a permanent, removable, secured or non-permanent manner. For example, a tile hook may be attached to a support structure, such as a roof, as exemplified at tile hook 84 in FIG. 1a, and its descriptions. As another example, a PV module may be attached to a support span as exemplified at cam foot 101 in FIG. 3 and its descriptions.

Auto-grounding or automatic grounding refers to electrically connecting a device, equipment, chassis, frame, or the like to a metal structure or earth in a manner essentially independent of external influence or control, or working by itself with little or no direct human control, or happening automatically when another operation is performed for ensuring a common electrical potential; in some situations being connected to the Earth or a large mass of conductive material may provide a position of zero potential. One such automatic grounding device is exemplified as pin 115 in FIG. 6b, and its descriptions.

Axis of rotation refers to a center around which something rotates, sometimes considered a straight line through all fixed points of a rotating rigid body around which all other points of the body move in a circular manner. Some exemplar axis of rotations for coupling portions are exemplified at Point A in FIG. 3, along with related descriptions.

Bracket refers to a simple, essentially rigid structure in the general shape of an L, one arm of which extends approximately 70-110 (often close to 90) degrees from the other arm. A Bracket is often an overhanging member that projects from a structure (such as a portion of a wall or frame) and may be designed to support a load with a vertical component, such as a skirt. A bracket may also refer to a fixture projecting from a wall, column, frame or the like which may be used for holding, securing, positioning or supporting another object. One such bracket attaching a groove to a support span is exemplified as cam foot 101 in FIG. 3, and its descriptions. As another example, a bracket attaching a PV module to a support span is exemplified as cam foot 101 in FIG. 11a, and its descriptions.

Connect or connecting refers to loosely, slidably, or rigidly bringing together or into contact with or joining or fastening to form a link or association between two or more items, mechanisms, objects, things, structures or the like. For example, a spanner bar connected to another spanner bar may be exemplified at splice 118 in FIG. 9a, and its descriptions. For another example, a spanner bar connected to a groove in a PV module frame may be exemplified at cam foot 101 in FIG. 11b, and its descriptions. For an additional example, a spanner bar connected to a tile hook may be exemplified at clamp 103 in FIG. 8, and its descriptions.

Connector refers to an object, item, mechanism, apparatus, combination, feature, link or the like that loosely, slidable, or rigidly links, interlocks, joins, unites or fastens two or more things together. May also include a device, an object, item, mechanism, apparatus, combination, feature, link or the like for keeping two parts of an electric or electronic circuit in contact. For example, a connector for connecting or coupling the end of one rail to an end of another rail may be exemplified at splice 118 in FIG. 9a and its descriptions.

Couple refers to loosely, slidably, or rigidly joining, linking, interlocking, connecting or mating two or more objects or items, mechanisms, objects, things, structures or the like together. For example, two modules may be coupled together, as exemplified at interlock 45 in FIG. 30, and its descriptions.

Coupling refers to an object, item, mechanism, apparatus, combination, feature, link or the like that loosely, slidably, or rigidly joins, links, mates, interlocks, or connects two things together. For example, a two rails may be coupled together by a coupling device, as exemplified at interlock 45 in FIG. 30, and its descriptions.

Double male connector refers to a connector (see above) having two male or insertable members, usually used for connecting two female or receiving parts or coupling members together. An example double male connector may be exemplified at splice 118 in FIG. 9a, and its descriptions.

Disengage refers to detaching, freeing, loosening, extricating, separating or releasing from something that holdsfast, connects, couples or entangles. See Engagement below.

End refers to a final part, termination, extent or extremity of an object, item, mechanism, apparatus, combination, feature, or the like that has a length. For example, an end of a rail may be exemplified at Location E in FIG. 7a, and its descriptions.

Engage refers to interlocking or meshing or more items, mechanisms, objects, things, structures or the like. See Disengage above.

Frame refers to an essentially rigid structure that surrounds or encloses a periphery of an item, object, mechanism, apparatus, combination, feature, or the like. For example, a PV module may have a frame around its edges as exemplified at frame 23 in FIG. 3, and its descriptions.

Freely refers to being without or exempt from substantial restriction or interference by a given condition or circumstance. May also refer to being unobstructed, unconstrained, unrestricted or not being subject to external restraint. For example, double male connector which is locked to a rail and freely insertable into another rail may be exemplified at Location F in FIG. 9a, and its descriptions.

Groove refers to a long, narrow cut, rut, indentation, channel, furrow, gutter, slot or depression often used to guide motion or receive a corresponding ridge or tongue. Some grooves in the frame wall of a PV module are exemplified at Area G in FIG. 2, and its descriptions.

Height adjustable refers to change or adapt to bring items, objects, mechanisms, apparatus, combinations, features, components or the like into a proper, desired or preferred relationship of a distance or elevation above a recognized level, such as the ground or a support surface. Some height adjustable devices are exemplified at Area H in FIG. 5, and its descriptions.

Insertable refers to an object, item, mechanism, apparatus, combination, feature, link or the like which is capable of being put in, entered into, set within, introduced, inset, inserted, placed, fit or thrust into another an object, item, mechanism, apparatus, combination, feature, link or the like. An example double male connector which may be insertable into a support span is exemplified at splice 118 in FIG. 9a, and its descriptions.

Integer multiple refers to a product of any quantity and a member of the set of positive whole numbers $\{1, 2, 3, \ldots\}$. An integer multiple of a width of said PV module may actually be somewhat longer or shorter than the absolute width of the PV module, so as to permit or facilitate connection to a PV module, as by attachment to one or more frame members of a PV module, as may be exemplified at Area I in FIG. 1a, and its descriptions.

Integral with refers to being essential or necessary for completeness, constituent, completing, containing, entire, or forming a unit. May also refer to consisting or composed of parts that together constitute a whole. An example frame integral with & supporting a PV laminate is exemplified at frame 23 in FIG. 3, and its descriptions.

Length refers to the measurement or extent of an object, item, mechanism, apparatus, combination, feature, link or the like from end to end, usually along the greater or longer of the two or three dimensions of the body; in distinction from breadth or width. An example of a length of a spanner bar is exemplified at Notation L in FIG. 8, and its descriptions.

Locked refers to fastened, secured or interlocked. An example double male connector locked to a support span may be exemplified at Location K in FIG. 9c, and its descriptions.

Orthogonally refers to relating to or composed of right angles, perpendicular or having perpendicular slopes or tangents at a point of intersection. An example spanner bar orthogonally connected to one of various locations along a PV module frame is exemplified at cam foot 101 in FIG. 3, and its descriptions.

Perimeter refers to an essentially continuous line forming the boundary, periphery or circuit of a closed geometric figure; the outer limits of an area. An example perimeter of a PV laminate surrounded by a frame is exemplified at frame 23 in FIG. 1a, and its descriptions.

Pivotally refers to or relates to an object, item, mechanism, apparatus, combination, feature, link or the like serving as a pivot or the central point, pin, shaft or contact on which another object, item, mechanism, apparatus, combination, feature, link or the like turns, swings, rotates or oscillates. An example spanner bar pivotally connected to a PV module frame is exemplified at spanner bar coupling 302 in FIG. 23, and its descriptions.

Positionable refers to an object, item, mechanism, apparatus, combination, feature, link or the like which is capable of being positioned, placed or arranged in a particular place or way. An example of rails which are independently positionable relative to a PV module are exemplified at span bar 102 in FIG. 3, and their descriptions.

PV laminate refers to a photovoltaic device having an interconnected assembly of solar cells, also known as photovoltaic cells which is frequently, but not always, laminated with glass and/or other materials. A PV laminate with an integral frame which may support the PV laminate is sometimes referred to as a PV module (see below). An example PV laminate is exemplified at laminate 300 in FIG. 1a, and its descriptions.

PV module refers to a photovoltaic module (sometimes referred to as a solar panel or photovoltaic panel) is a packaged interconnected assembly of solar cells, also known as photovoltaic cells, frequently, but not always, laminated with glass and other materials and sometimes surrounded by a frame. A plurality of PV modules are commonly used to form a larger photovoltaic system referred to as a PV array (see below), to provide electricity for commercial, industrial and residential applications. An example PV module is exemplified at module 10 in FIG. 1a, and its descriptions.

PV array refers to s plurality of photovoltaic modules (see above) connected together often in a pattern of rows and columns with module sides placed close to or touching other modules. An example PV array is exemplified at array 81 in FIG. 1a, and its descriptions.

Quarter turn or ¼ turn refers to an angle of rotation of an object, item, mechanism, apparatus, combination, feature, link or the like which is usually measured in degrees or radians having a range of between approximately 70 to 110 degrees, or sometimes between 80 to 100 degrees. An example of a coupling receiving a ¼ turn when connecting to a rail is shown or described at cam foot 101 in FIG. 3, and its descriptions.

Rail refers to refers to a relatively straight, usually essentially evenly shaped along its length, rod, beam, girder, profile or structural member or the like, or plurality of such, of essentially rigid material used as a fastener, support, barrier, or structural or mechanical member. For example, a two rails coupled together by a coupling device are exemplified at span bar 102 in FIG. 23, and its descriptions.

Removeable refers to one or more items, mechanisms, objects, things, structures or the like which are capable of being removed, detached, dismounted from or taken-away from another item or the like, or combination.

Rectilinear refers to one or more items, mechanisms, objects, things, structures or the like which are essentially bounded by, characterized by or forming straight and substantially parallel lines. An example rectilinear double male connector may be exemplified at splice 118 in FIG. 9a, and its descriptions.

Rigidly couples refers to joining, linking, connecting or mating two or more objects or items, mechanisms, objects, things, components, structures or the like together in a non-flexible manner that is difficult to bend or be forced out of shape. For example, two span bars may be rigidly coupled together, as exemplified at splice 118 in FIG. 9a, and its descriptions.

Roof refers to a structure or protective covering that covers or forms the upper covering or top of a building. The upper surface of a roof is often used as a support surface for mounting, connecting or otherwise attaching a PV module or a PV array. For example, some roofs are exemplified at Roof 83 in FIG. 1a, and its descriptions.

Rotatably refers to one or more items, mechanisms, objects, things, structures or the like which are capable of being rotated, revolved or turned around or about an axis or center. For example, a portion of a coupling adapted to rotatably engage a PV module is exemplified at coupling 107 in FIG. 3, and its descriptions.

Skirt refers to an edging, molding or covering that may be fixed to the edge of a PV module to conceal or block the bottom area under a PV array when the PV array is mounted to a support surface. Some skirts are exemplified at skirt 104 in FIG. 10a, and its descriptions.

Span refers to an extent or measure of space between, or the distance between two points or extremities. For example, a spanner bar which solely spans a width of a PV module is exemplified at span bar 102 in FIG. 10a, and its descriptions.

Spanner bar refers to a relatively straight, usually evenly shaped along its length, rod, beam, girder, profile or structural member of essentially rigid material used as a fastener, support, barrier, or structural or mechanical member which spans a distance between an edge of a PV module and an attachment device, such as a tile hook, stand-off, hanger bolt or the like. For example, a spanner bar which spans a width of a PV module is exemplified at span bar 102 in FIG. 10a, and its descriptions.

Support or supporting refers to one or more items, mechanisms, objects, things, structures or the like which are capable of bearing weight or other force, often to keep the item or the like from falling, sinking, slipping or otherwise moving out of a position. For example, a frame which is shown as integral with and supporting a PV laminate is exemplified at frame 23 in FIG. 2, and its descriptions.

Support structure refers to a structure, such as a roof, table or the ground which may provide a base for securing PV modules to form a PV array. Some support surfaces are exemplified at roof 83 in FIG. 1a, and its descriptions.

Threaded refers to one or more items, mechanisms, objects, things, structures or the like which have, embody or include an essentially helical or spiral ridge or rib, as on a screw, nut, or bolt. An example of a threaded adjustment member for varying distance between a point on module and a rail may be exemplified at threaded stud 113 in FIG. 5, and its descriptions.

Various locations refers to places, positions or sites that are different from one another, more than one, individual or separate. For example, a spanner bar which may connect at various locations along a frame of a PV module is exemplified at span bar 102 in FIG. 3, and its descriptions.

Vertical height adjustment refers to change or adapt to bring items, mechanisms, objects, things, components, structures or the like or components into a proper, desired or preferred relationship of a distance or elevation above a recognized level, such as the ground or a support surface. Some vertical height adjustment devices are exemplified at Area J in FIG. 5, and its descriptions.

Width refers to the state, quality, or fact of being wide or a measurement or extent of something from side to side; in distinction from breadth or length. For example, a spanner bar which spans a width of a PV module is exemplified at span bar 102 in FIG. 3, and its descriptions.

Referring now to FIG. 1A, there is shown a perspective view of a PV array including a plurality of PV modules 100 laid out in an x-y reference plane on a roof or support structure 81 such as a roof. PV modules 100 are shown in various Figs. with an integral frame 23 and as being faced with clear glass instead of a typical PV laminate with encapsulated PV cells in order to enable a view beneath PV modules 100 that reveals the mounting system hardware. One skilled in the art will recognize that PV modules 100 may comprise various types and numbers of PV cells. FIG. 1A also shows typical roofing tiles, such as tiles 82 and typical batons such as batons 83. Other types and forms of batons and tiles are hereby expressly contemplated, such as roofing materials that are flat tiles, rolled-on or other flat or shaped materials. Various tiles 82 are shown in the Figs. only partially covering support structure 81 in order to enable a more complete view of support structure 81 and hardware beneath tiles 82. Support structure 81 is herein shown as including a generally planar surface, however it may be a structure with thickness, width, depth, length and/or other dimension(s). In reference to any appropriate mounting structure, such as support structure 81, the height adjustment of a coupling described hereinafter is considered relative to any essential surface or essential plane, such as a top surface. For ease of understanding this embodiment, a y-direction corresponds to the north-south dimension of the array, and an x-direction corresponds to the east-west direction. In the embodiment of FIG. 1A, the reference plane is effected as being coextensive with a surface of various PV modules 10, when PV modules 100 are positioned in their final installed positions. However, in further and various other embodiments, some of which are illustrated below, a reference plane may be above an upper surface of PV modules 10, or below the lower surfaces of PV modules 100.

A PV array 80 may be assembled together and attached to support structure 81 as by means of a discrete attachment point mounting system, which may comprise any or many of: cam feet, spanner bars, array skirts, double-tongue feet, brackets, feet, leveling feet, interlocks, parallel couplings, double-key couplings, key couplings and/or the like, some of which are explained in more detail below. Other components may be coupled to array 80 such as for example a grounding coupling, also further explained below. The PV array 80 of FIG. 1A is shown by way of example only. It is understood that PV array 80 may have more or less PV modules 100, such as in the x and/or y direction. In the embodiment shown in FIG. 1A, the support structure 81 may be a roof, such as a slanted roof of a residential dwelling or the like. However, it is understood that the PV array 80 may be supported on a wide variety of other support surfaces, such as for example a flat roof, a ground-mounted structure, a vertical support structure, or other structures which are understood by one of skill in the art. The defined x-y reference plane for the PV array 80 is substantially parallel to support structure 81, and may be oriented in any of a wide variety of angles from horizontal to vertical. In other embodiments an x-y reference plane may be at an angle to support structure 81.

FIG. 1A further shows a series of tile hooks 84 attached to rafters 85 in any usual manner, such as with a lag screw (not shown) or the like. Tiles 82 are connected to battens 83 in any reasonable or usual manner. As seen on the right side of FIG. 1A, tile hooks 84 may slip between tiles 82 at approximately the low point of curved tile 82 profile. The exposed y-axis length, commonly referred to as a "reveal", of one or more tiles 82 may set a distance A between available discrete attachment points in the y-axis; and rafter location may set a distance B between available discrete attachment points along the x-axis. Therefore PV array 80 may be said to comprise discrete, rather than continuous, attachment points.

Figures 1B, 1C:
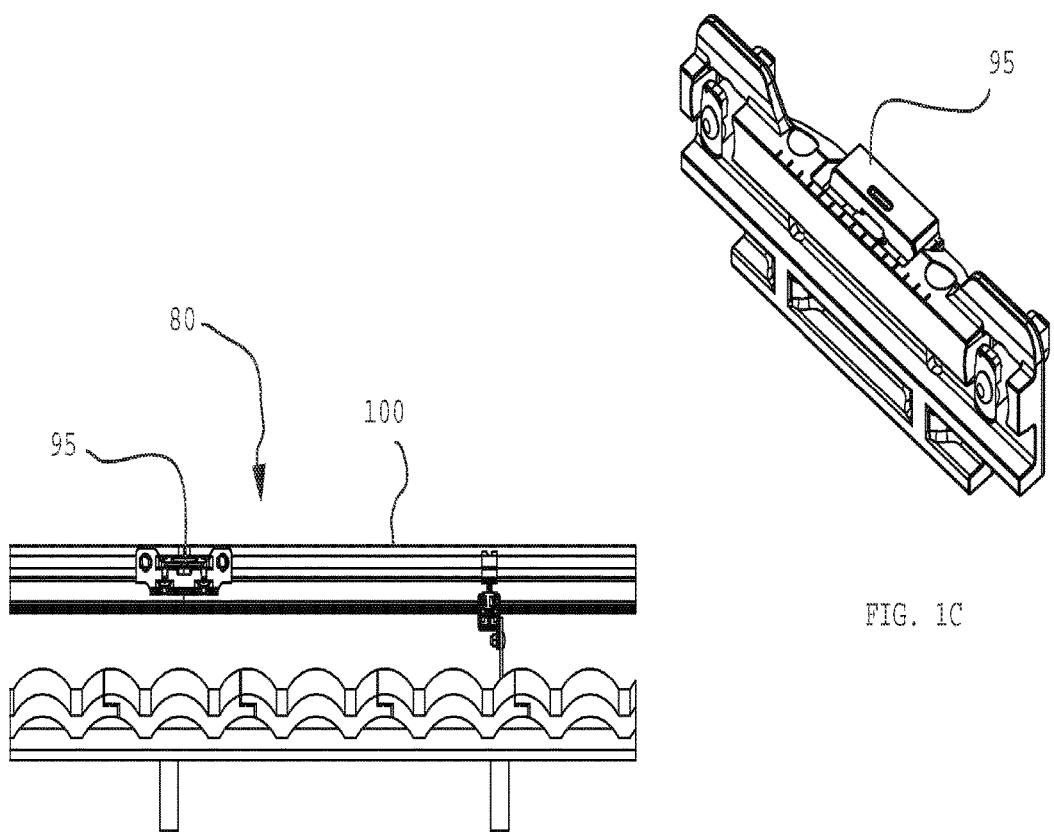
FIG. 1B shows a perspective view of a portion of an array on a roof.
FIG. 1C is a perspective view of an interlock.

FIG. 1B shows PV array 80 from a perspective up-roof from PV array 80 and shows an installed interlocking device, such as interlock 95, which may provide a structural and ground bond connection between PV modules 100 at PV module 100 corner locations. Interlocks are discussed in further detail below.

FIG. 1C shows interlock 95 which provides both X and Y axis structural and ground bond connections. Interlock 95 may be installed by inserting into frame grooves 11A and rotating frame coupling components 45A roughly 90 degrees. It is specifically contemplated that interlock 95 may be made of aluminum and steel, but other reasonably rigid materials, such as other metals or plastics, may be suitable as well.

Figure 2:
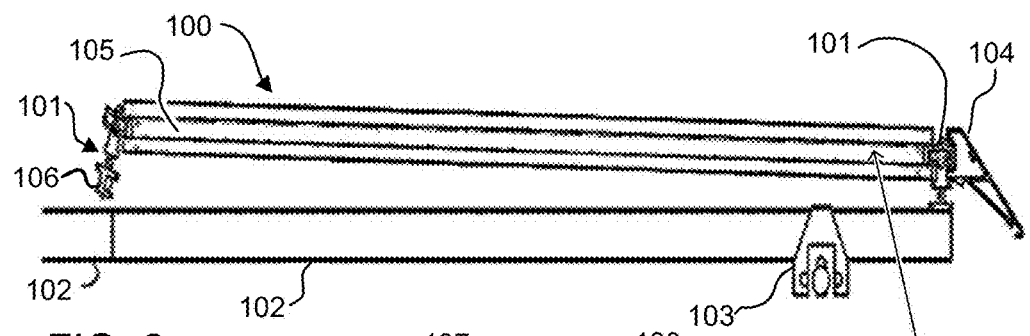
FIG. 2 is a perspective view of a PV module with a skirt.

FIG. 2 shows a side view of a photovoltaic module, such as PV module 100. As shown, attached to PV module 100 is a connector, such as a cam foot 101. As will be discussed in more detail below, cam foot 101 pivots into a groove of a PV module 100 frame 23, such as frame groove 105. Cam foot 101 is also connected, as by a cam nut 111, to an underlying support, such as a spanner bar 102, as discussed in greater detail below. As described in more detail below, cam foot 101 may also be connected to a skirt or other visual blocking or fire limiting device, such as an array skirt 104, and may connect array skirt 104 to PV module 100. Spanner Bar 102 may be coupled or otherwise connected to adjacent Spanner Bar 102a, as by way of a press-fit, slip fit, or other connection as discussed further below. Spanner Bar 102 may also be inserted through a clamp, such as bar clamp 103, as shown in FIG. 2, the function of which will be described further below. It is specifically contemplated that frame 23 of PV module 100 may be made of aluminum, but other reasonably rigid materials, such as other metals or plastics, may be suitable as well. It is also contemplated that cam foot 101, spanner bar 102, bar clamp 103, and array skirt 104 may be made of aluminum, steel, or a combination thereof, but other reasonably rigid materials, such as other metals or plastics, may be suitable as well.

Figure 3:
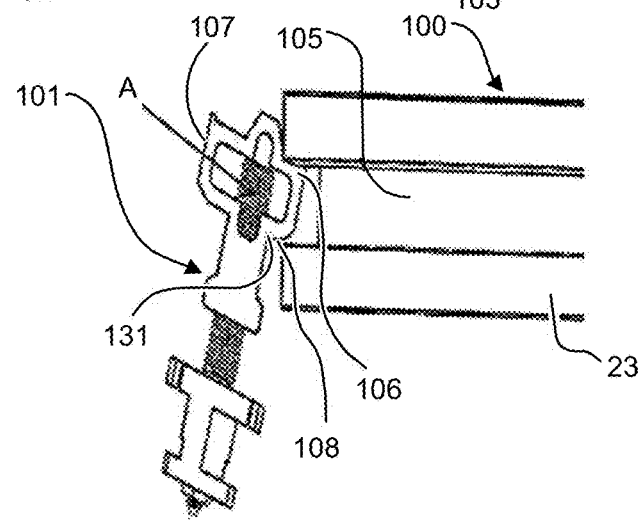
FIG. 3 shows a perspective view of a cam foot in contact with a PV array over spanner bars.

FIG. 3 shows cam foot 101 with a short tongue side, such as short tongue side 106, and a long tongue side, such as long tongue side 107. Also shown is a hump on the lower side of short tongue side 106, such as hump 108. Short side tongue 106 of cam foot 101 is shown connecting to a frame groove, such as frame groove 105 by means or way of a pivot-fit. A fully engaged home position of cam foot 101 may be defined by a slight rise 131 in the curved portion of hump 108. Slight rise 131 may provide resistance to forces that would tend to rotate cam foot 101 back out of engagement with frame 23. In the shown embodiment of FIG. 3, installation may be tool-free, that is, installation of PV array 80 of PV modules 100 may be effected without using mechanical or electrical tools. The installation of cam foot 101 into frame groove 105 provides a rapid, tool-free (in some embodiments), auto-grounding (in some embodiments), means or system for adjustably connecting cam foot 101 to PV module 100. Cam foot 101 is adjustable in the x-axis as by variably attaching to frame groove 105 to line up with rafter 85 or location of attachment, such as a tile hook, as further described below. As described below, cam foot 101 may further provide pivot-fit or drop-in connections to up-roof modules. In other embodiments, cam foot 101 may connect to frame groove 105 via a ¼ turn key-in and may require a tool. Other embodiments discussed below may also provide auto-grounding connections; for example whereby a stainless steel pin (not shown here) in short tongue side 106 may pierce frame 23 to create a ground bond connection.

Figure 4:
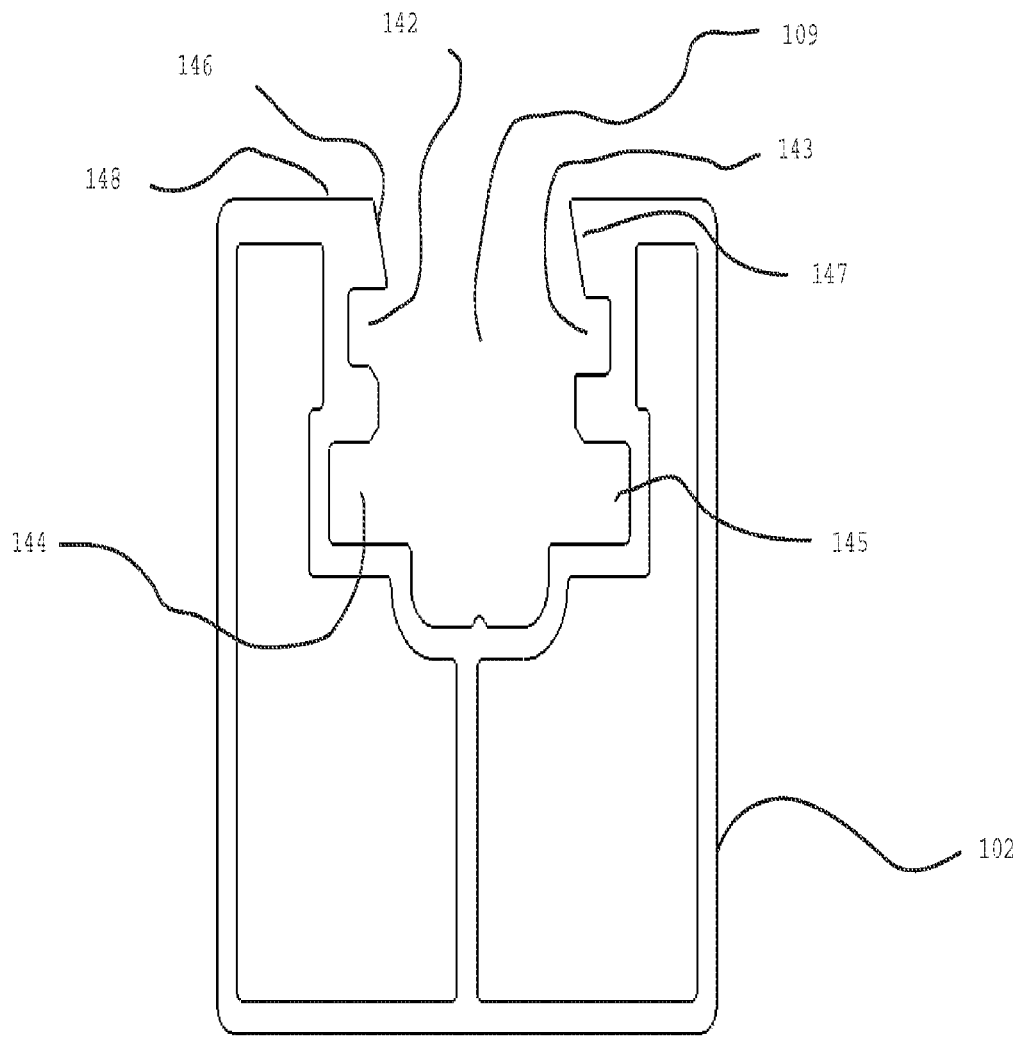
FIG. 4 is a cutaway view of a spanner bar.

FIG. 4 shows a cross-sectional view of spanner bar 102 and a groove feature such as spanner groove 109. Spanner groove 109 may comprise upper key slots 142, 143, lower key slots 144, 145, and lips 146, 147. In some embodiments a shape of an upper portion of spanner groove 109 may be substantially similar to a shape of frame groove 105, thereby enabling compatible equipment, such as such as spring clips for retaining wires, snap-in electrical boxes, PV module electronic devices, and so on, to be capable of connecting to both frame groove 105 and spanner groove 109.

Figure 5:
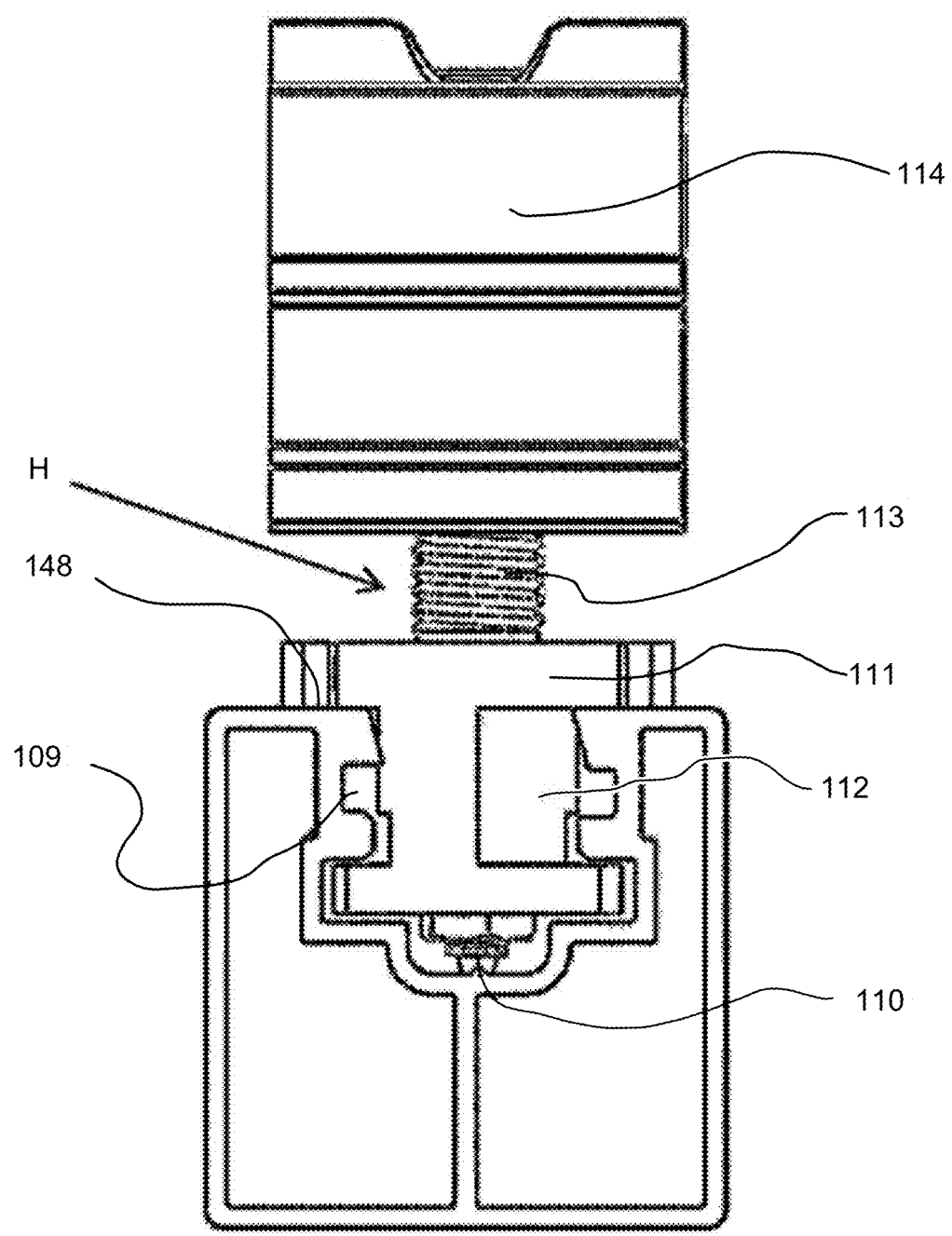
FIG. 5 is a perspective view of a cam foot inserted into a cutaway spanner bar.

FIG. 5 shows cam foot 101 installed in spanner groove 109. Also shown are various sub-components of cam foot 101. A cup point or cone point bonding feature may be provided, such as cone point 110, which is shown in FIG. 5 as contacting a bottom surface of spanner groove 109. The connection between cone point 110 and spanner groove 109 may be accomplished by compression (see below) which causes cone point 110 to cut into spanner bar 102 to create a ground bond connection. A cam nut, such as cam nut 111, is shown partially inserted into spanner groove 109. A camming surface, such as camming surface 112, is shown engaged in spanner groove 109. Cam nut 111 and camming surface 112 will be described in more detail below. A threaded stud, such as stud 113, may be rotatably captured by cam nut 111 at a first end and threaded into coupling such as double tongue coupling 114 at a second end. Stud 113 causes coupling 114 to fall and rise in the z-axis when stud 113 is rotated clockwise and counter-clockwise respectively. In another embodiment (not shown), the direction of rotation of stud 113 will cause coupling 114 to rise and fall when stud 113 is rotated clockwise and counter-clockwise respectively. Such rotation may provide a simple mechanism to enable rapid height adjustment of PV module 100, and other height adjustment mechanisms, such as ratchets or other devices, are hereby expressly contemplated.

FIG. 6a and FIG. 6b show another embodiment whereby a metal pin, such as pin 115, may be installed in short tongue side 106 of cam foot 101 and may create a ground bond connection between coupling 114 and PV module 100 groove 105 by cutting into module groove 105. FIG. 6a shows pin 115 protruding from a bottom side of short tongue 106; and FIG. 6b shows pin 115 protruding from a top side of short tongue 106. In other embodiments pin 115 only protrudes from either the top or bottom of short tongue 106. In combination with the grounding action of cone point 110 (see above), the grounding action of pin 115 may create a reliable grounding path from spanner bar 102 to module frame 105.

Figures 7A, 7B:
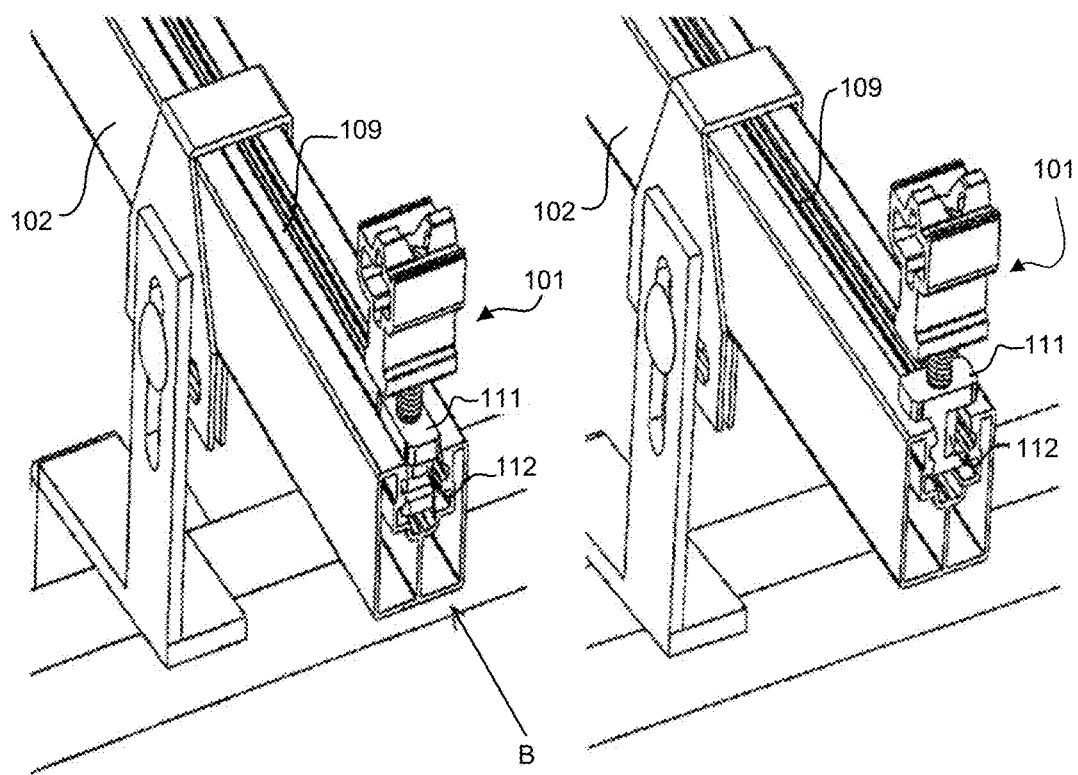
FIGS. 7A and 7B is a perspective view of a cam foot inserted into a spanner bar.

FIG. 7a shows cam foot 101 inserted into spanner groove 109. FIG. 7b shows cam foot 101 fully engaged with spanner groove 109 and with cam nut 111 rotated approximately 90 degrees (for example, from between 50 to 130 degrees, or 60 to 120 degrees, or 70 to 110 degrees) from its position in FIG. 7a. When cam nut 111 is rotated approximately 90 degrees from its position in FIG. 7a, camming surface 112 may press against and spread spanner groove 109. This action may be complemented by lower key 138 on cam nut 111 jamming into lower key slots 144, 145 and cone point 110 cutting into spanner bar 102 to form a substantially rigid connection between cam nut 111 and spanner bar 102. This connection arrangement may provide a rapid, auto-grounding connection that may require less than 360.degree. of rotation, such as approximately 90.degree., with between 70.degree. to 110.degree. of rotation (see description above), and may provide adjustability in the y-axis since cam foot 101 may be able to be connected to spanner bar 102 at essentially any point substantially along its whole length. In other embodiments the orientation of spanner bars is rotated 90.degree. from the orientation of FIG. 1, thereby enabling cam foot 101 to spanner bar 102 connections substantially anywhere along the x-axis of PV array 80. In another embodiment, cam nut 111 may comprise a camming surface that expands against other surfaces of spanner groove 109, such as upper key slots 142, 143, lower key slots 144, 145 or other walls of spanner groove 109.

Figure 8:
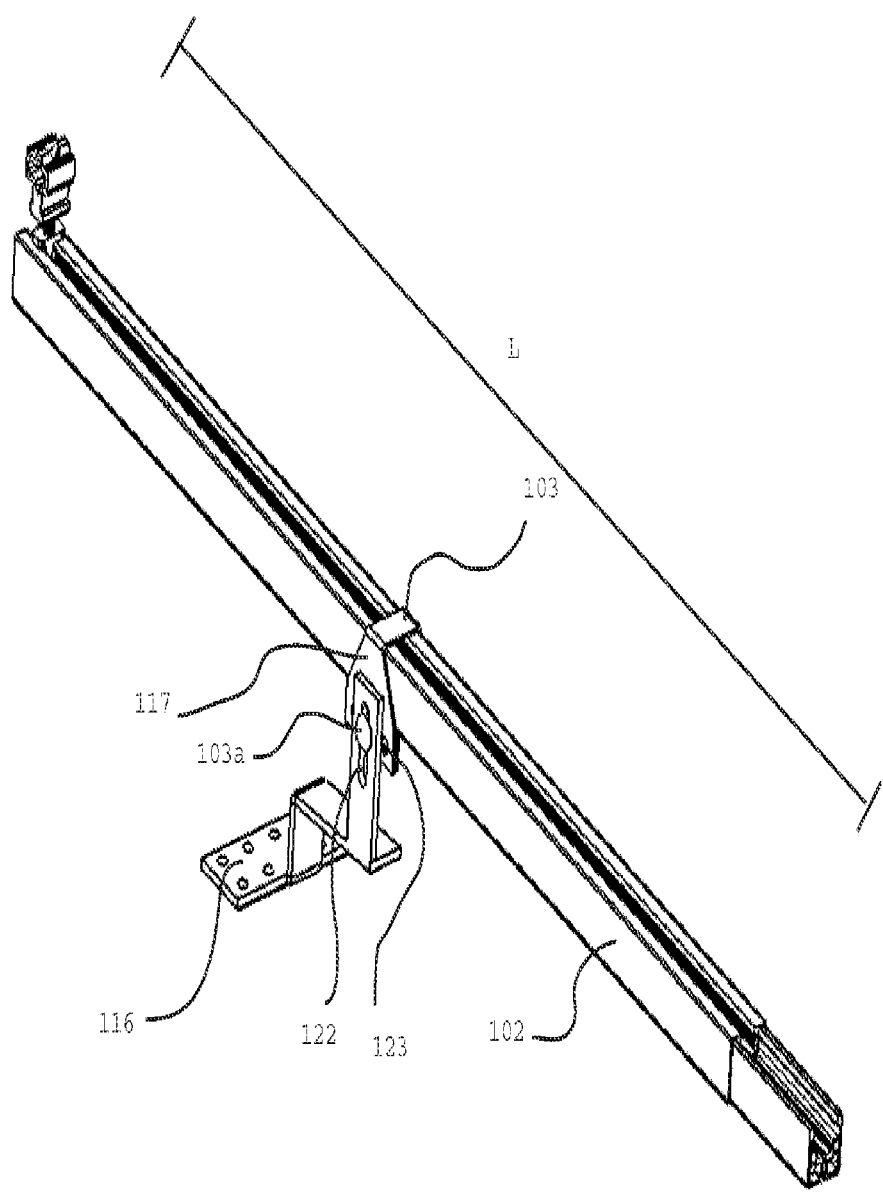
FIG. 8 is a perspective view of a spanner bar connected to a tile hook.

FIG. 8 shows bar clamp 103 connected to a tile hook, such as tile hook 116. In other embodiments, bar clamp 103 may be connected to other types of tile hooks or other components such as stand-offs, stanchions, threaded rods, and/or the like. Bar clamp 103 may be connected to tile hook 116 via a carriage bolt 103a and nut (not shown). In other embodiments, bar clamp 103 may be connected as by other fastener types such as snap-in, press-fit, cam lock, or other mechanical connections known in the art. FIG. 8 also shows surface 117 of bar clamp 103. Surface 117 may, in various embodiments, be oriented perpendicular or in other manner to its orientation as shown in FIG. 8. For example, tile hook 116 may be replaced by a tile hook with a substantially flat plate top surface, instead of a vertical wall as shown in FIG. 8, and bar clamp 103 may be rotated approximately 90.degree. counter-clockwise to connect to it. The variable orientations in which bar clamp 103 may be installed, may allow it to be mated with a wide variety of roof tile hooks and other roof attachment types or mechanisms. The connection of bar clamp 103 to tile hook 116 or other attachment hardware types as described above, may provide simple and rapid means for connecting bar clamp 103 to standard roof attachment systems such as tile hooks, stand-offs, stanchions, threaded rods, and others which are common or known in the art.

FIG. 8 also shows bar clamp 103 connected to spanner bar 102. Spanner bar 102 may be inserted through bar clamp 103 as shown. The connection between spanner bar 102 and bar clamp 103 may be made via a wrap-around friction connection, whereby a bolt 103a may deform the approximately square shape of bar clamp 103 as it may be tightened around approximately square spanner bar 102. In other embodiments, other connection types such as snap-in, press-fit, cam lock, and other mechanical connections known in the art may be used. Some embodiments may provide dimples (not shown) on bar clamp 103 to ensure proper angular alignment with x-y reference plane. The connection between spanner bar 102 and bar clamp 103 may provide a means for rapid and rigid connection of these components.

Figure 9A:
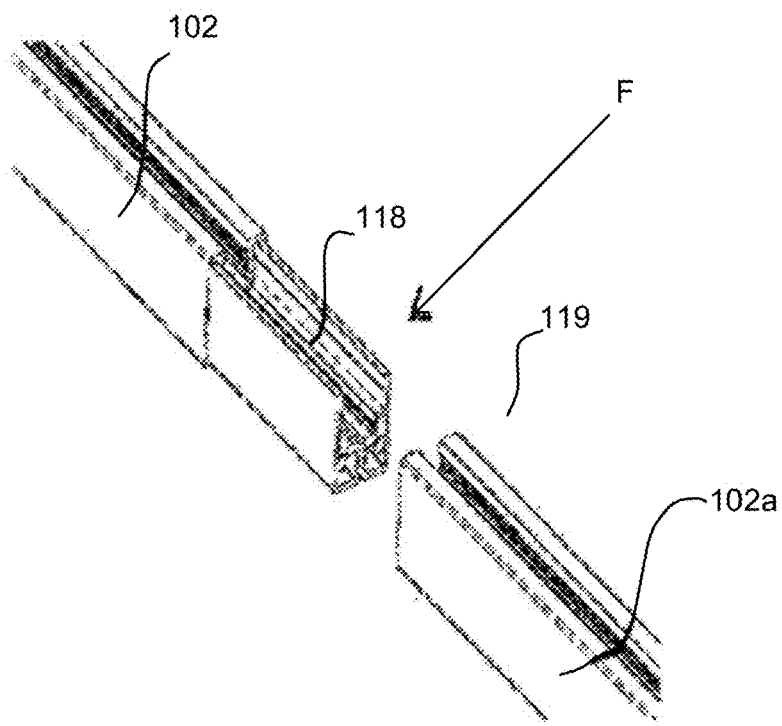
FIG. 9A is a perspective view of two spanner bars with a double male connector.
Figure 9B:
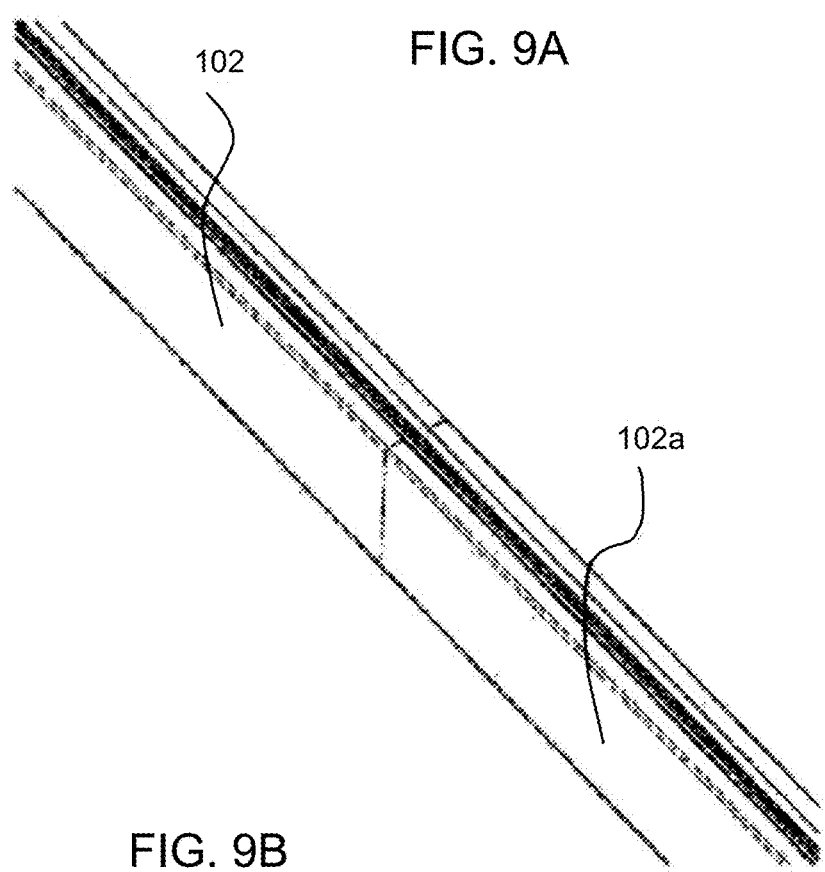
FIG. 9B is a perspective view of two spanner bars, which are connected.
Figure 9C:
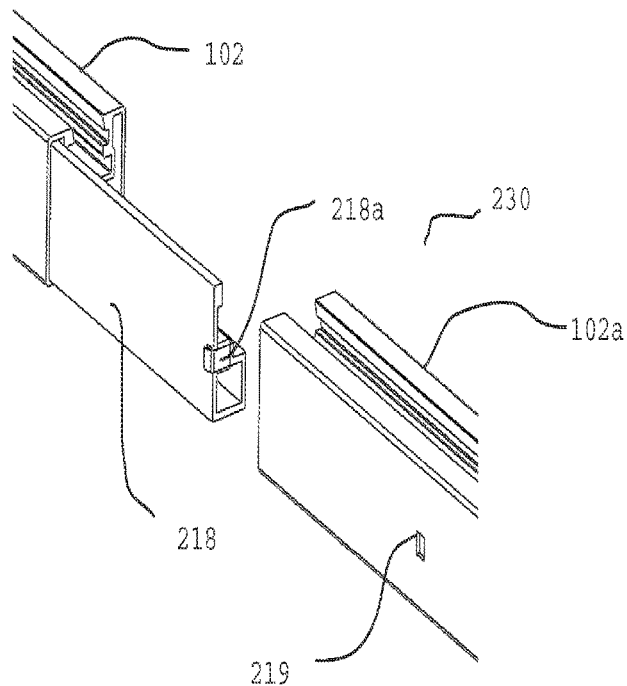
FIG. 9C is a perspective view of two spanner bars with a double male connector.
Figure 9D:
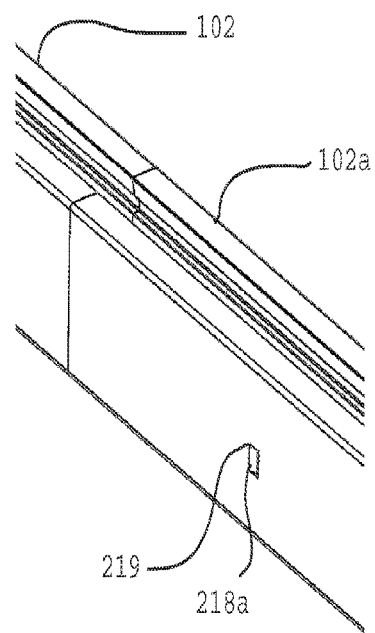
FIG. 9D is a perspective view of two spanner bars, which are connected.

FIG. 9a shows spanner bars 102 and 102a and a splicing device, such as double male connector 118, which is installed at one end of spanner bar 102. FIG. 9b illustrates how spanner bar 102 and spanner bar 102a may be coupled together by pressing end 119 of spanner bar 102a onto double male connector 118. This connection may be accomplished by means of an interference or press fit but may, in other embodiments, be accomplished by a slip-fit, bolted connection or the like.

Figure 9E:
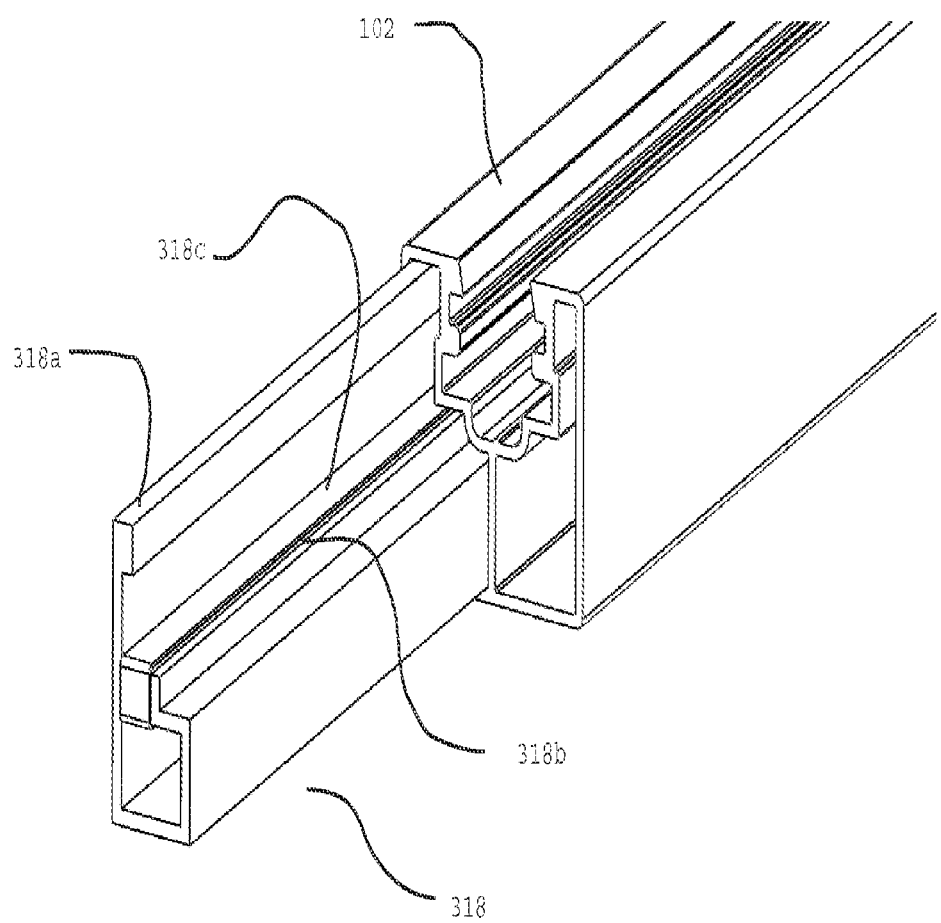
FIG. 9E is a perspective view of a spanner bar with a double male connector.

FIG. 9e shows spanner bar 102 with one double male connector 118 removed. Double male connector 118 may have two male or insertable members for inserting into female portions near or at the ends of spanner bars 102. Double male connector 118 as shown in FIG. 9e may comprise a resilient rubber or spring material 318b covered by a protective layer (not shown). Spring material 318b may help to take up dimensional variations in the materials utilized and/or prevent rattle. Protective cover may help to prevent damage to spring material 318b during insertion. Double male connector 118 may also comprise a substantially rectilinear shape along its length that is primarily characterized by straight and substantially parallel lines. Other embodiments contemplate chamfered or tapered forms. Approximately half of a length of double male connector 118 may be inserted into spanner bar 102. The remaining approximately half of double male connector 118 may be inserted into spanner bar 102*a*. While spanner bar 102 comprises 2 double male connectors 118, other embodiments (whether shown or not shown herein) comprise spanner bars with only one double male connector 118.

Figures 10A, 10B:
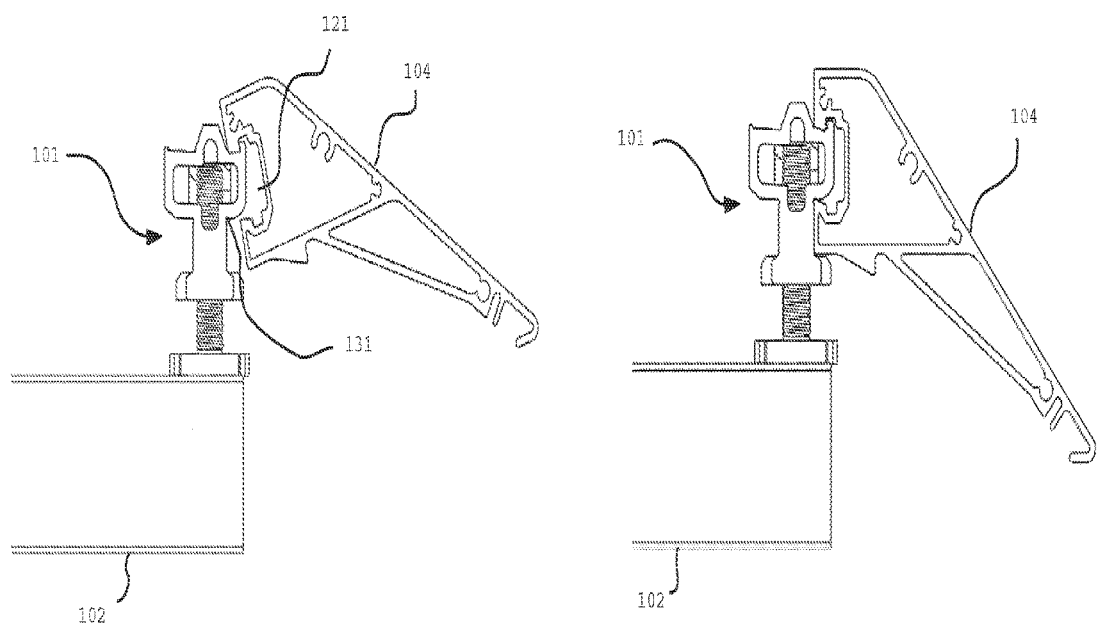
FIGS. 10A and 10B are side views of a skirt connecting to a cam foot.

As shown in FIGS. 10*a* and 10*b*, array skirt 104 may be connected to cam foot 101 for rapid, snap-on installation. FIG. 1A0*a* shows a groove, such as skirt groove 121, placed onto short tongue side 106 of cam foot 101. FIG. 1A0*b* shows the final position of installed array skirt 104. FIGS. 10*a* and 10*b* illustrate a method of installation, whereby array skirt 104 may be pivoted downward from the position illustrated in FIG. 10*a* to the position illustrated in FIG. 10*b*. When in the fully engaged position, as shown in FIG. 10*b*, a lip of skirt groove snaps into recess formed by slight rise 131 on lower side of short tongue 106 (as discussed above). In the embodiment shown in FIGS. 10*a* and 10*b*, installation may be tool-free. The installation of cam foot 101 into frame groove 105 may provide a rapid, tool-free (in some embodiments), auto-grounding (in some embodiments), means and method for adjustably connecting cam foot 101 to array skirt 104. In still other embodiments coupling 114 may further comprise a lock or an anti-rotation component which may be inserted full skirt engagement in order to resist disengagement of skirt 104.

Figure 11A:
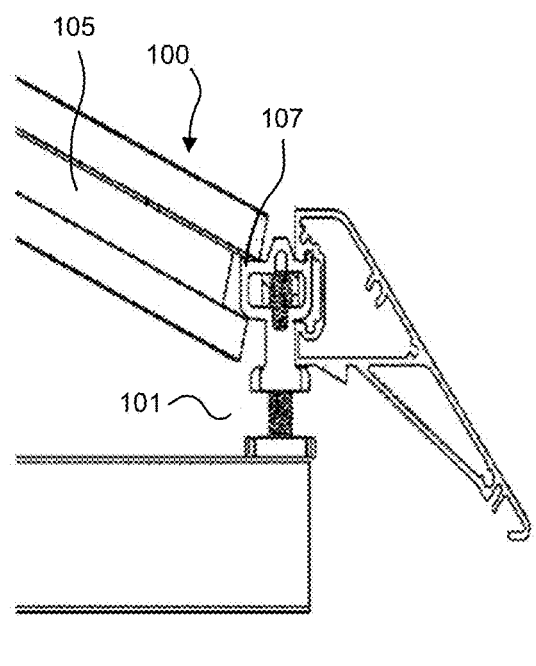
FIGS. 11A and 11B are side views of a cam foot connecting to a skirt and a PV module.
Figure 11B:
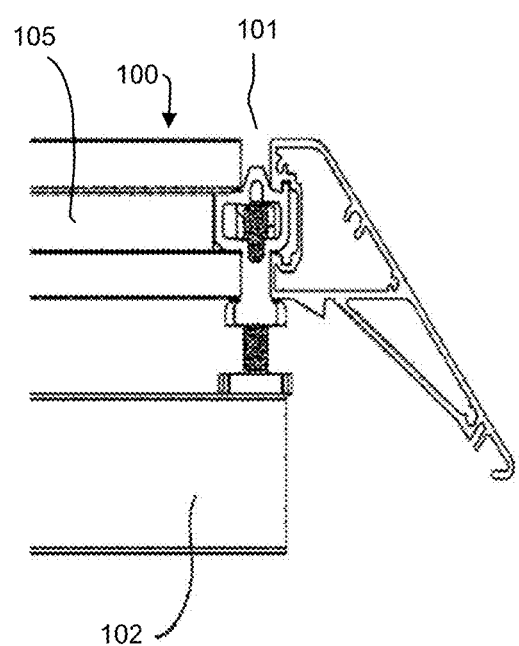
Figure 12:
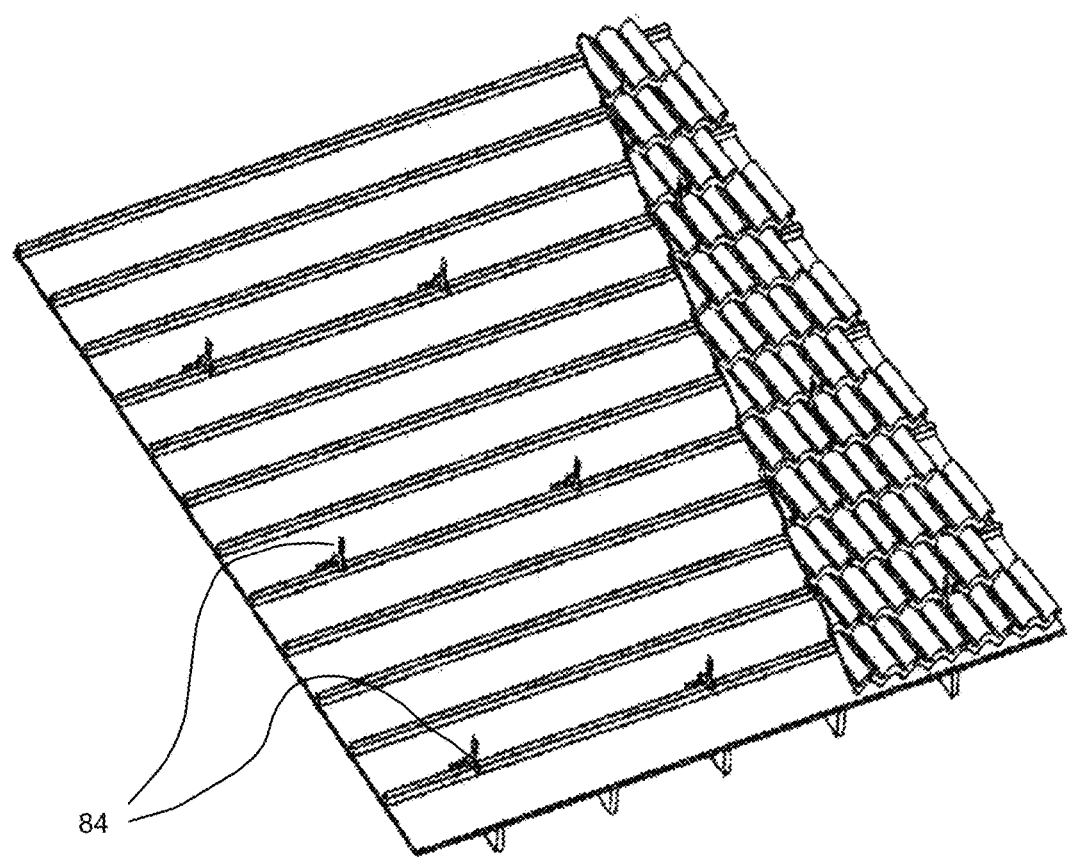
FIG. 12 is a perspective view of a roof with tile hooks.
Figure 13:
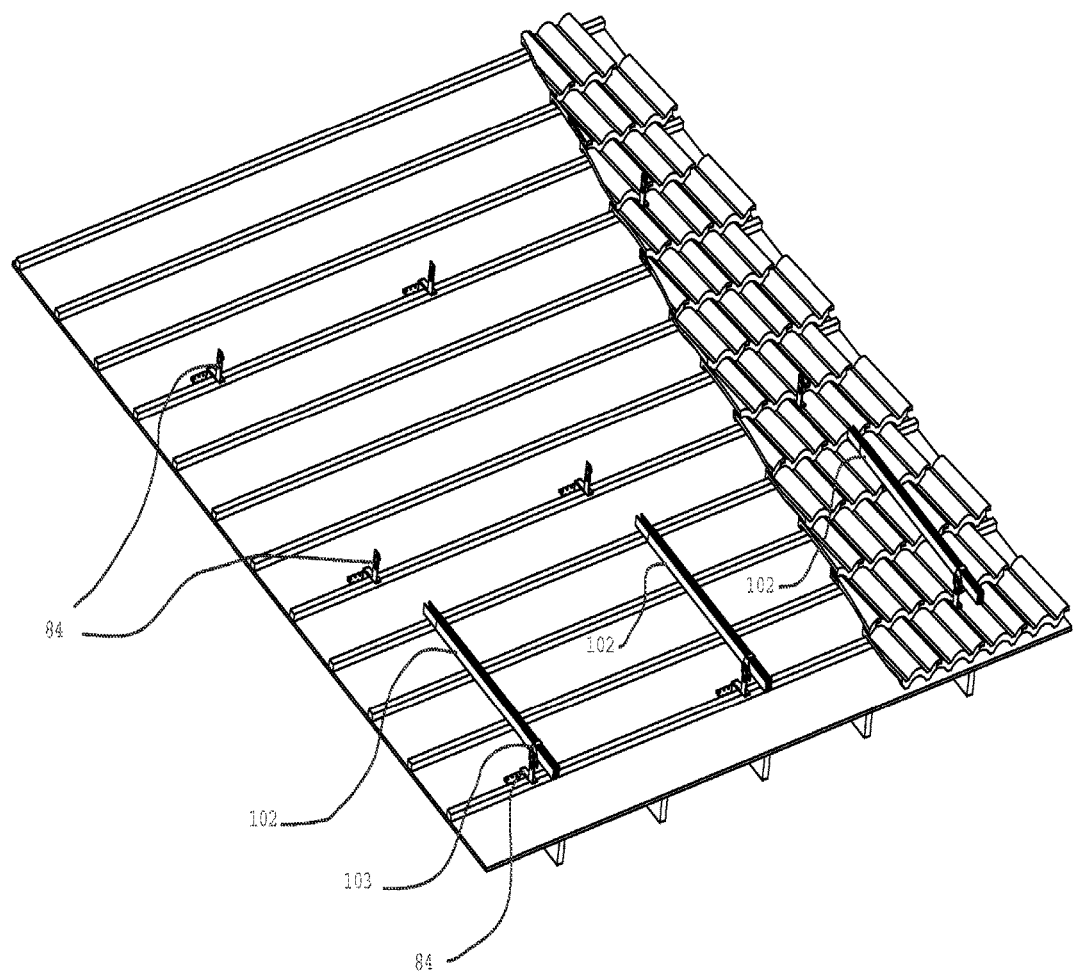
FIG. 13 is a perspective view of a roof with tile hooks and spanner bars.
Figure 14:
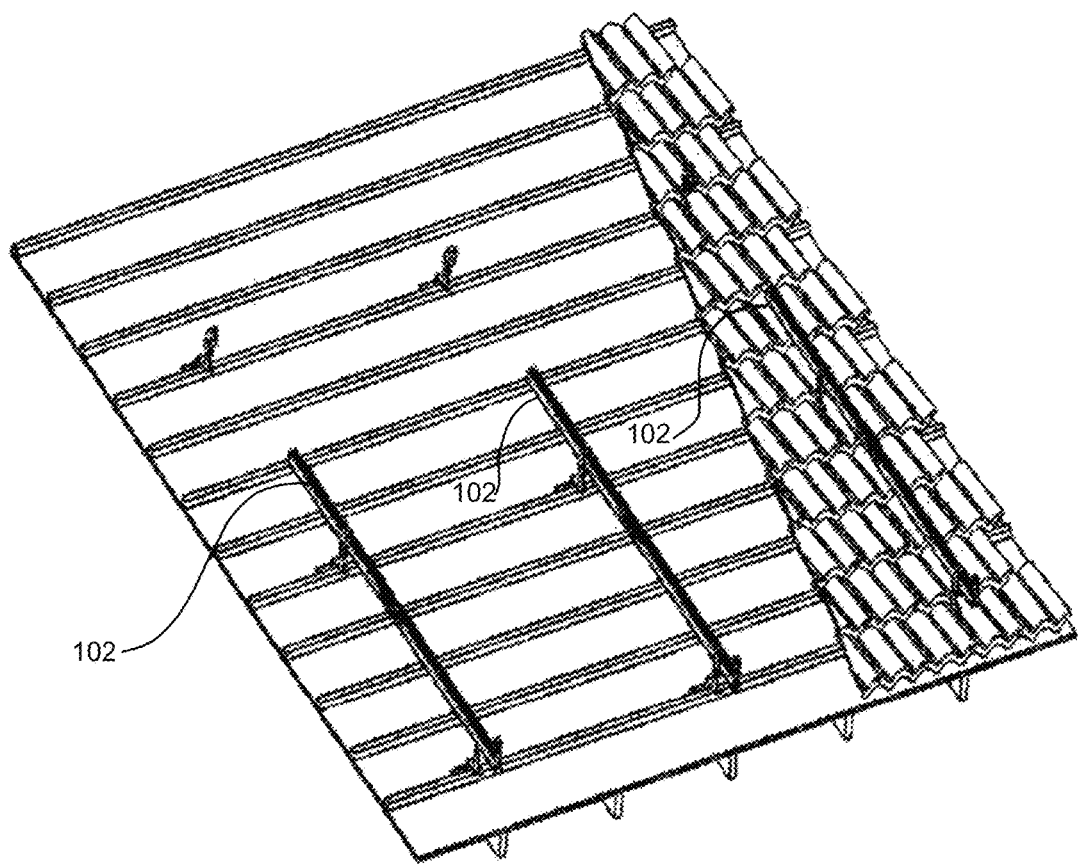
FIG. 14 is a perspective view of a roof with tile hooks and spanner bars.
Figure 15:
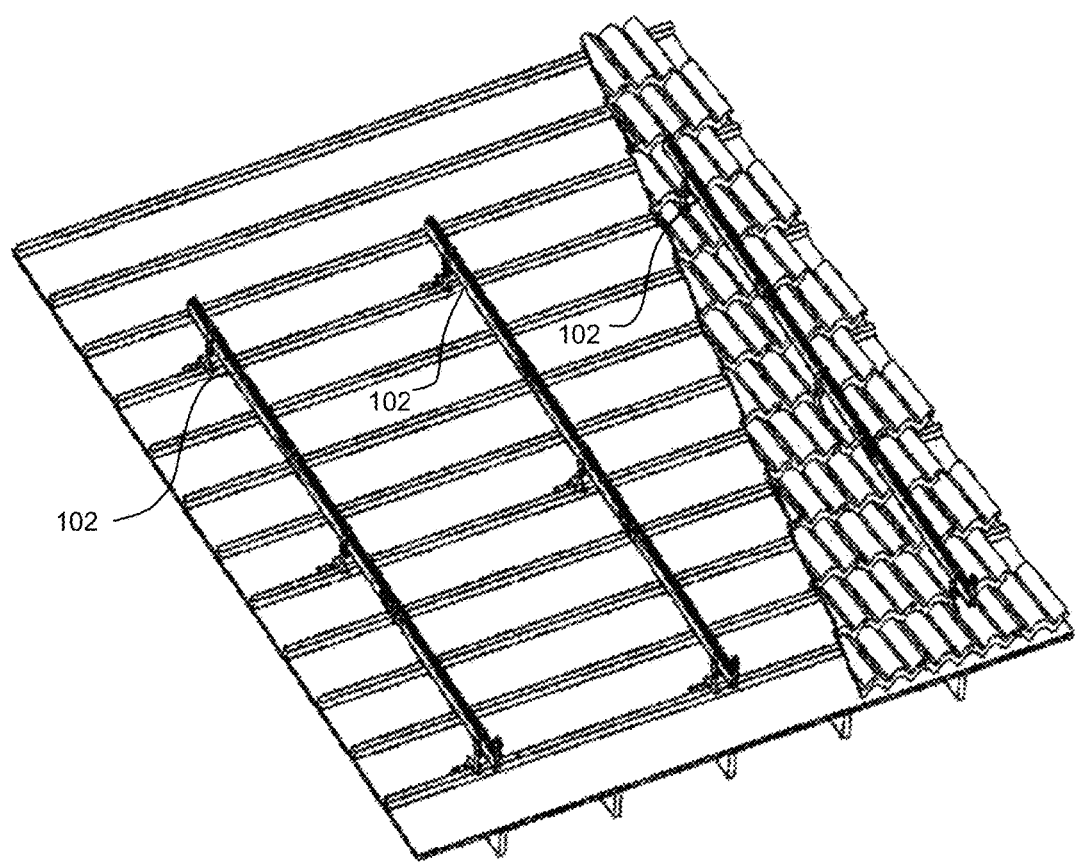
FIG. 15 is a perspective view of a roof with tile hooks and spanner bars.
Figure 16:
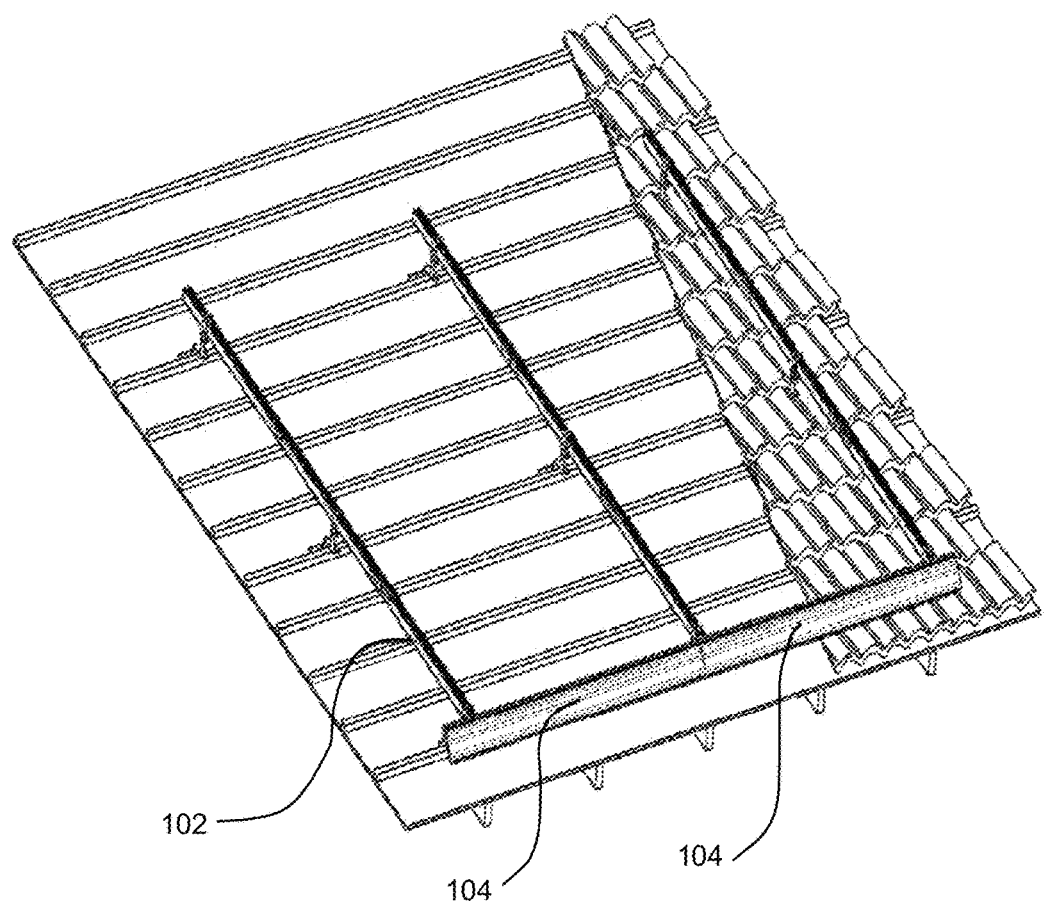
FIG. 16 is a perspective view of a roof with tile hooks and spanner bars and skirts.
Figure 17:
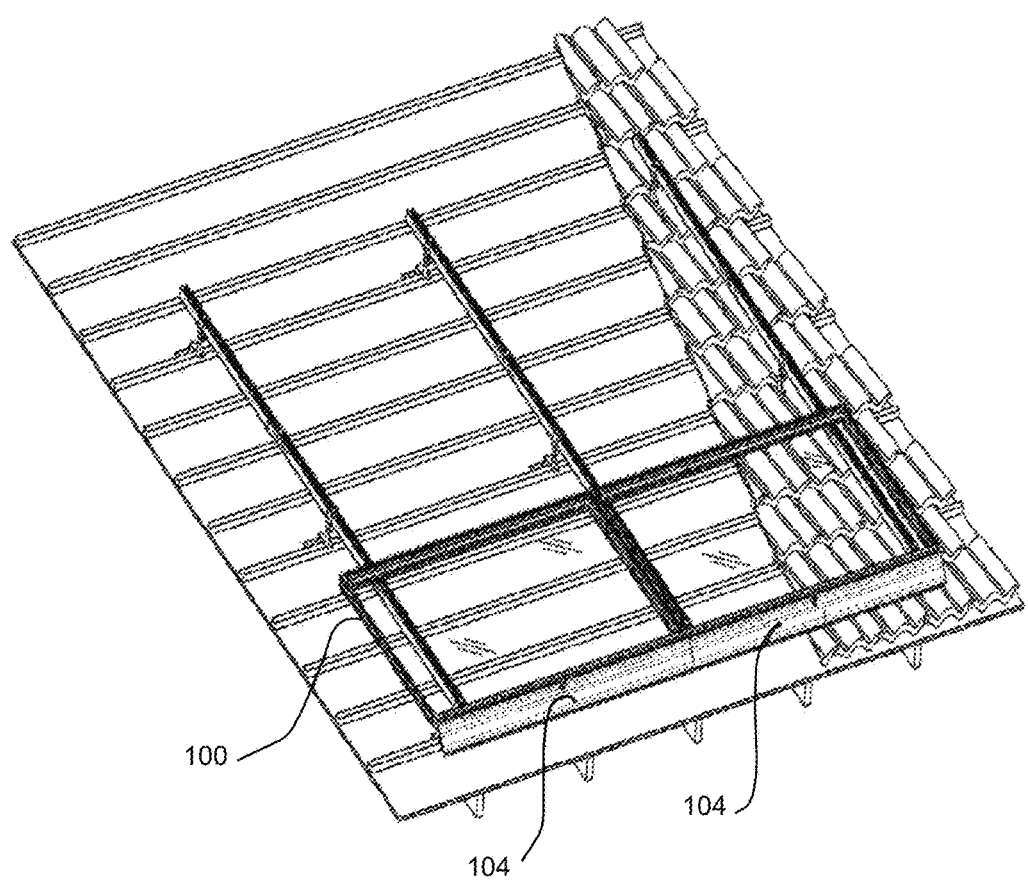
FIG. 17 is a perspective view of a roof with tile hooks, spanner bars, and a PV modules.

FIG. 11*a* and FIG. 11*b* show a pivot-fit method of installation whereby frame groove 105 may be placed on long tongue side 107 of cam foot 101 at a first angle of approximately 15-60 degrees (as in FIG. 11*a*) and rotated downward to a second angle of approximately 0.degree. (as in FIG. 11*b*). Offset bearing points in frame groove 105 may allow insertion of long tongue into frame groove 105 at the first angle, then restrict movement in the z-axis between frame groove 105 and long tongue 107 at the second angle. Long tongue may be inserted into frame groove 105 to various depths in order to align PV module 100 with adjacent PV modules 100 (not shown). This installation method may offer rapid, tool-free (in some embodiments), auto-grounding (in some embodiments), means and method for adjustably connecting PV module 100 to cam foot 101. This installation method may allow adjustability in the x-axis by variably positioning PV module 100 onto cam foot 101 to line up with roof rafters or a location of attachment means, such as tile hook 116 described further above and below.

FIGS. 12 through 17 show a method of installing a PV array such as PV array 80 shown in FIG. 1A. In such a method, PV modules 100 (similar to PV modules 100 shown in FIG. 2) may be installed on tile roofs 81 using the following set of procedures:

1. Place tile hooks 84 at pre-determined north-south (N-S) and east-west (E-W) locations, as shown. These locations may be determined by referencing load tables (such as incorporated herein by reference) that present calculated N-S and E-W spacing based on inputs such as average wind speed, wind category, roof slope and snow load (see especially FIG. 12).
2. Attach first row of spanner bars 102 to tile hooks 84 by slipping bar clamp 103 over front row spanner bar 102, aligning tile hook slot 84A with a slot 123 in bar clamp 103, and using a bolt 103*a* and nut (not shown) or other common fasteners (see especially FIG. 13).
3. Attach second row of spanner bars 102 (see especially FIG. 14) by inserting spanner bar double male connector 118 into female end of spanner bar 102*a*. (see especially FIGS. 9*a*, 9*b*) Attach spanner bar 102 to a second row of tile hooks 84 (see especially FIG. 14) by once again slipping bar clamp 103 over spanner bar 102 and aligning tile hook slot 122 with spanner bar clamp slot 123 and using a bolt 103*a* and nut (not shown) or other common fasteners (see especially FIG. 8).
4. Attach cam foot 101 to spanner bar 102 located on the front row by inserting cam nut 111 into spanner groove 109 (see especially FIG. 8*a*) and rotating cam nut 111 a quarter turn within spanner groove 109 to widen groove 109 and create a spring force lock onto cam nut 111 (see especially FIG. 8*b*).
5. Attach remaining rows of spanner bars 102 by again inserting spanner bar double male connectors 118 and attaching spanner bars 102 as previously described (see especially FIG. 15).
6. Once all spanner bars 102 have been attached in place (see especially FIG. 16), install array skirt 104 (similar to skirt 104 in FIG. 16) to the front row of cam foot 101 (see especially FIGS. 10*a*, 10*b*).
7. Install first row of PV modules 100 (similar to PV modules 100 shown in FIG. 2) onto cam foot 101 (see especially FIGS. 11*a*, 11*b*). Connection of PV module 100 to cam foot 101 may create a continuous ground path from frame groove 105 to cam foot 101 and thus to the spanner bar 102 (see especially FIG. 11*b*).
8. Ensure PV modules 100, (similar to PV modules 100 in FIG. 2) are essentially level to each other and parallel to the rooftop 81. If they are sufficiently out of alignment, rotate threaded studs 113 in cam foot 101, to raise or lower appropriate PV module edges.
9. Install the next row of PV modules 100 (similar to PV modules 100 in FIG. 2) by first attaching cam foot 101 to frame groove 105 (see especially FIG. 28), and then attaching cam foot 101 (see especially FIG. 3) to spanner groove 109 (see especially FIG. 4).
10. Repeat these procedures until entire PV array 80 is installed and level. (see especially FIG. 1A)

FIGS. 12 through 17 show a method of installing a PV array such as PV array 80 shown in FIG. 1A. In such a method, PV modules 100 (similar to PV modules 100 shown in FIG. 2) In other embodiments spanner bars 102 may be run horizontally instead of vertically on the roof and in still other embodiments PV modules 100 (similar to PV modules 100 in FIG. 2) may be oriented in portrait orientation instead of landscape as shown. Other and similar arrangements are explicitly considered, including PV modules not being oriented in a N-S or E-W plan.

Figures 18A, 18B, 18C:
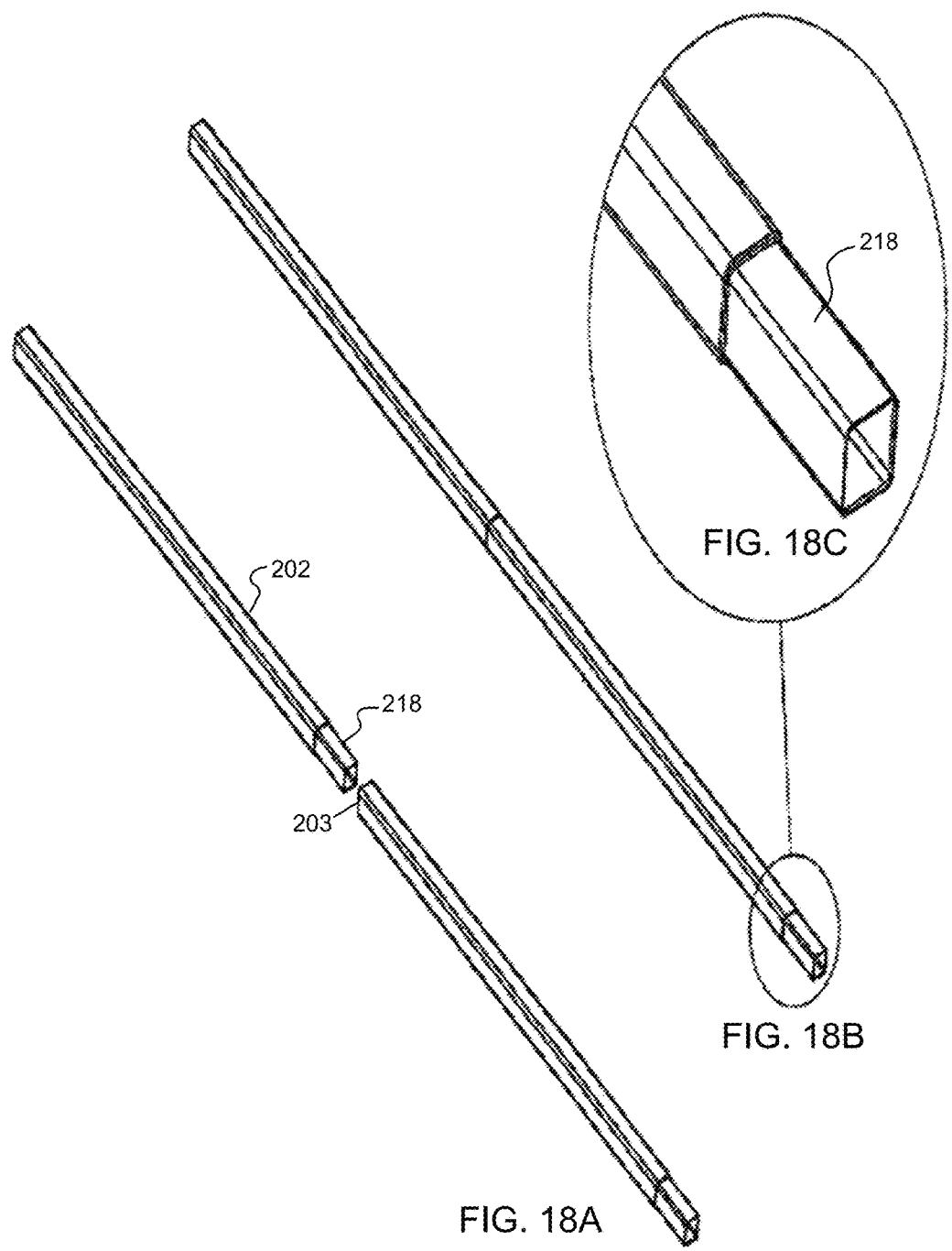
FIG. 18A is a perspective view of two spanner bars each with a double male connector.
FIG. 18B is a perspective view of two connected spanner bars.
FIG. 18C is a perspective view of an enlargement of an end of a spanner bar showing a double male connector.

FIG. 18 shows an embodiment of a spanner bar, such as spanner bar 202. Spanner bar 202 may be similar to spanner bar 102 except that double male connector 118 is replaced by a necked down portion 218 of spanner bar 202 and there is no spanner groove 109. Necked down portion 218 may fit into a female portion 203 at an opposite end from necked down portion 218. Thus, spanner bar 202 may comprise a one-piece construction with one male end and one female end. Spanner bars 202 may be capable of mating end-to-end, in a manner similar to conventional tent poles. One skilled in the art will recognize that spanner bar 202 may comprise an inside diameter sized to fit bar clamp 103 as discussed above. In some embodiments spanner bar 202 may comprise a spanner groove 109. In embodiments where spanner bar 202 comprises a spanner groove 109, spanner bar 202 may mate with cam foot 101 as described above for spanner bar 102. In embodiments where spanner bar 202 does not comprise a spanner groove 109 (as depicted in FIG. 18), spanner bar 202 may connect to PV module 100 by way of a typical square tube clamping mechanism as are known in the art.

One or more additional benefits that the above described hardware, systems and methods may facilitate include the following:

- May provide a system that simplifies the hardware and/or installation procedure required to mount PV modules on a support structure that requires discrete attachment points, such as a tile roof or ground mount structure;
- May reduce or eliminate the need for long mounting rails beneath module arrays, thereby reducing problems associated with warehousing, shipping, and maneuvering long rails onto a roof;
- May increase layout flexibility and simplify installations on complicated roofs that may have numerous smaller roof surfaces and/or numerous obstructions (such as vent pipes, chimneys, and so on) since rails may not need to be cut on site;
- May enable more cost-effective mounting in landscape orientation since two rows of rail are not required for every row of PV modules as in conventional systems;
- May reduce total part count and total number of fasteners required;
- May improve the speed of installation and overall reliability of the PV array grounding system;
- May provide greater integration with other required equipment in the overall PV system, such as electrical junction and combiner boxes, wire management devices, and other equipment since some embodiments provide mounting hardware that may utilize similar male and female mating parts as other equipment in the system;
- May reduce a total length of spanner bar and/or rail material as compared to conventional systems due to optimization of structural support system;
- May reduce a total number of attachment points as compared to conventional systems due to optimization of structural support system;
- May enable faster PV array system installations due to the ability of a single installer to place and mount PV modules on support structure 81
- May allow for easy on site changes to array layout when an actual rooftop does not accurately match the one used for a planned PV array system design;
- May provide ability to adapt to uneven roof surfaces.

FIGS. 19 through 32 show an embodiment of a discrete attachment point mounting system.

Figure 19:
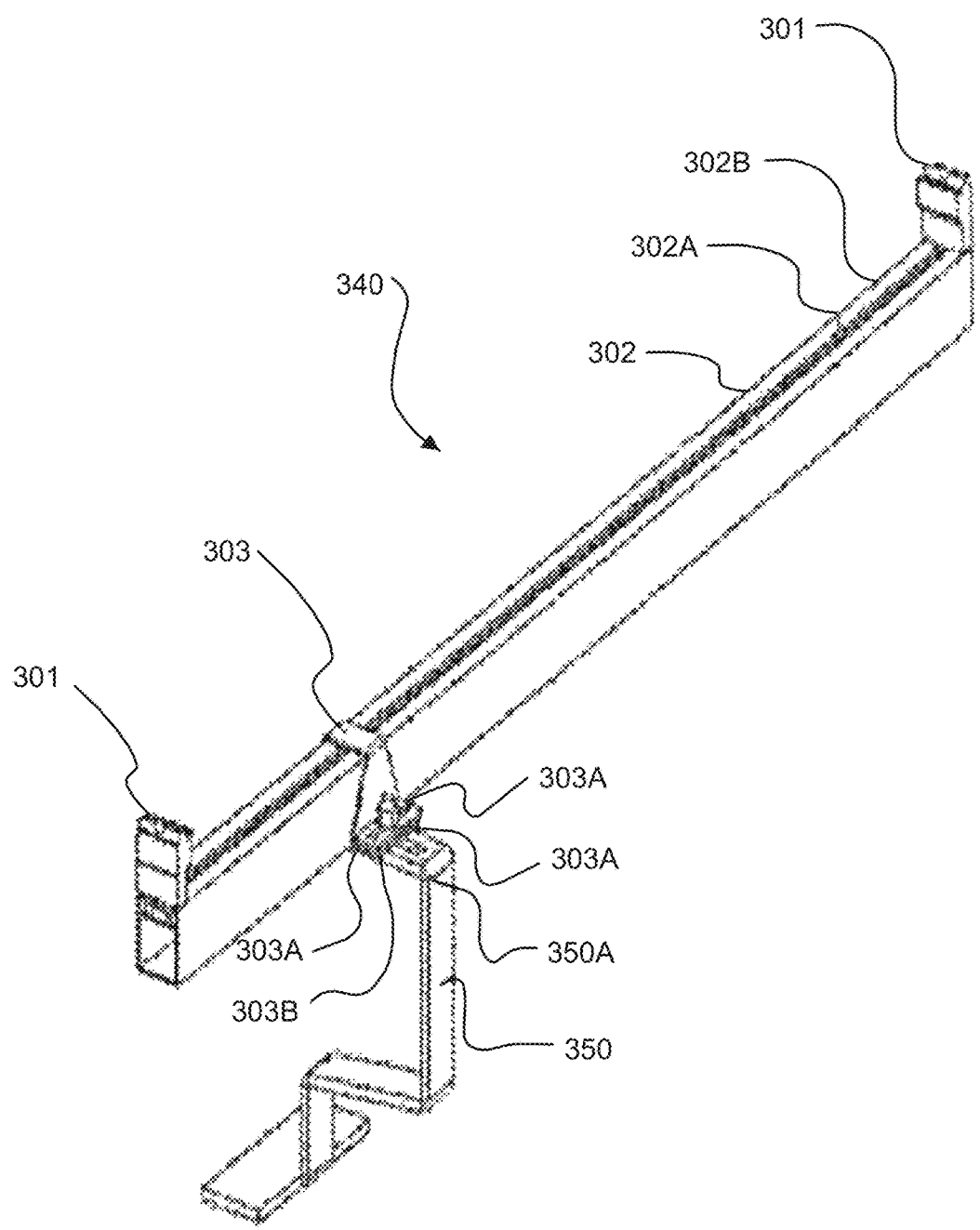
FIG. 19 is a perspective view of a spanner bar connected to a tile hook.

FIG. 19 shows a spanner bar assembly 340 comprising a connector such as a spanner bar coupling 301, a module spanning bar such as a spanner bar 302, and a module spanning bar clamp such as a bar clamp 303 that may mount to tile hooks 350 or other common tile mount hardware, as with common fasteners such as bolts, nuts, and washers which may be fastened through holes or slots such as clamp holes 303A and tile hook slot 350A. Spanner bar 302 may span one or two PV modules 309, but typically no more; as it may not be intended to replace a long rail which are commonly used in the art. Spanner bar 302 may be provided in lengths that are substantially close to one or two times the length or width of PV module 309 (herein referred generally referred to as "width"). Spanner bar 302 being relatively short and produced in a length that is essentially an integer multiple of the module dimension (noted as "width" above) may yield significant benefits in terms of ease of transport and speed of installation. In some embodiments spanner bar 302 may also provide a simple means to span from two PV module 309 frame 311 sides over to a tile hook 350, thereby freeing up either the x or y axis for positioning flexibility on a roof 308. In some embodiments spanner bar 302 spans the distance between frame 311 side on a first PV module 309 over to frame 311 side on an adjacent PV module 309, while crossing under first PV module 309. For example, an east frame 311 side on first PV module 311 may be effectively coupled to an east frame 311 side on second PV module 311 by way of spanner bar 302 and associated spanner bar couplings 301. In still other embodiments spanner bar 302 spans between two parallel frame sides of PV module 309.

Clamp holes 303A may be in various quantities and may be round, oval, slotted, or the like. As shown in more detail below, spanner bar coupling 301 may connect to spanner bar 302 via a nut 380 that locks in a groove such as spanner groove 302A within the top surface 302B of spanner bar 302 and a machine screw or bolt running through bar coupling 1 (not visible in this view). In other embodiments nut 380 and bolt are replaced by a quarter turn cam nut.

Bar clamp 302 may be connected to tile hook 350 via carriage bolt and nut. In other embodiments, bar clamp 2 may be connected via other fastener types, such as snap-in, press-fit, cam lock, and/or other mechanical connections known in the art. FIG. 19 also shows surface 303B of bar clamp 303. Surface 303B may, in other embodiments, be oriented perpendicular to its orientation as shown in FIG. 19. The variable orientations in which bar clamp 303 may be installed may allow it to be mated with a wide variety of roof tile hook and other roof attachment types. The connection of bar clamp 303 to tile hook 350 or other attachment hardware types as described above, may provide simple and rapid means for connecting bar clamp 303 to standard roof attachment systems such as tile hooks, stand-offs, stanchions, threaded rods, and/or others common in the art.

FIG. 19 also shows bar clamp 303 connected to spanner bar 302. Spanner bar 302 may be inserted through bar clamp 303 as shown. The connection between spanner bar 302 and bar clamp 303 may be made as by a wrap-around friction connection, whereby a bolt may deform the approximately square shape of bar clamp 303 as it may be tightened around the approximately square spanner bar 302. In other embodiments, other connection types such as snap-in, press-fit, cam lock, and/or other mechanical connections known in the art may be used. Some embodiments may provide dimples on bar clamp 303 to ensure proper angular alignment with a plane of the mounting surface. The connection between spanner bar 302 and bar clamp 303 may provide a means for rapid and rigid connection of these components.

It is contemplated that spanner bar assembly 340 comprises components made from aluminum, steel, or other hard metals, or plastic may be suitable as well.

FIG. 20 shows a photovoltaic module array such as PV array 330 mounted on a roof 308 with tile hooks 350 and spanner bar assemblies 340. PV Array 330 comprises a plurality of photovoltaic modules such as PV module 309. As in previous figures, a PV laminate is shown as clear glass so that components below may be viewed. FIG. 20 also shows an interlocking device, such as interlock 345, which may provide both structural and ground bond connections at the corners of PV modules 309. Interlock 345 is described in more detail below.

Figure 21:
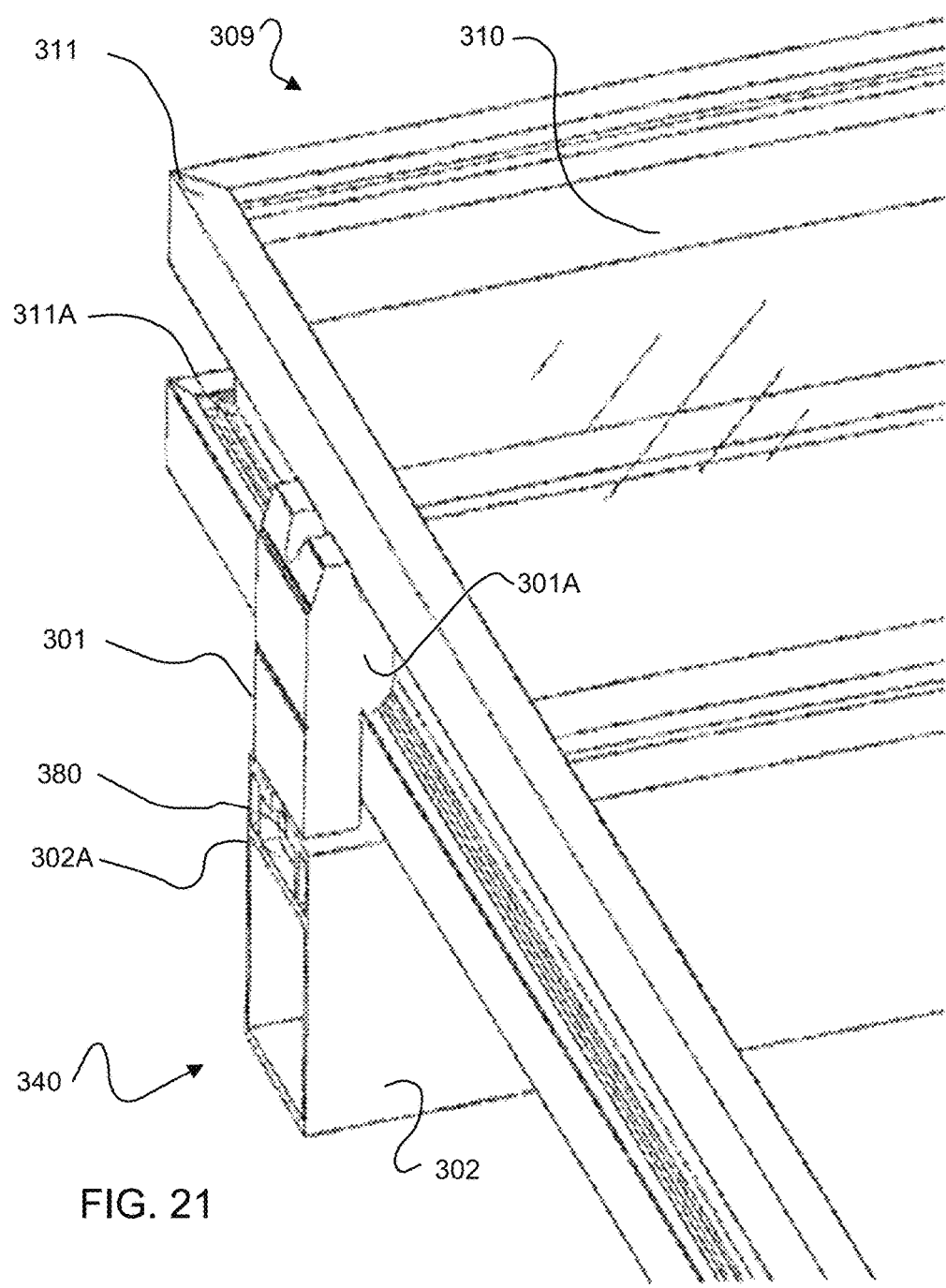
FIG. 21 is an enlarged perspective view of a portion of a PV module and spanner bar.

FIG. 21 shows a portion of PV module 309. As is common in the art, PV module 309 comprises a PV laminate 310 with an aluminum frame 311 to provide additional strength and a location for attachment of mounting hardware. Spanner bar assemblies 340 may be used with module frames that have a groove on the outer surface such as frame groove 311A.

Other embodiments comprise spanner bar assemblies optimized for use with non-grooved PV modules frames. In such embodiments, spanner bar coupling 301 may comprise a hold-down clamp or end clamp as are common in the art for non-grooved frame PV modules.

FIG. 21 also shows spanner bar coupling 301 connected to spanner bar 302 through the use of a bolt and nut 380 that interlocks with spanner groove 302A. As with cam foot 101 in FIG. 5, spanner bar coupling 301 may contain a cup or cone point bonding feature such as cone point 110. Spanner bar coupling 301 may be attached to module frame 311 using a geometrically compatible part feature 301A that interlocks with the groove 311A located on the outer surface of the module frame 311 by way of a rotational tool-free motion. In other embodiments a standard T nut may be used instead of cam nut 307.

FIGS. 22 through 32 show the steps required for installing a photovoltaic array such as PV array 330.

Figure 22:
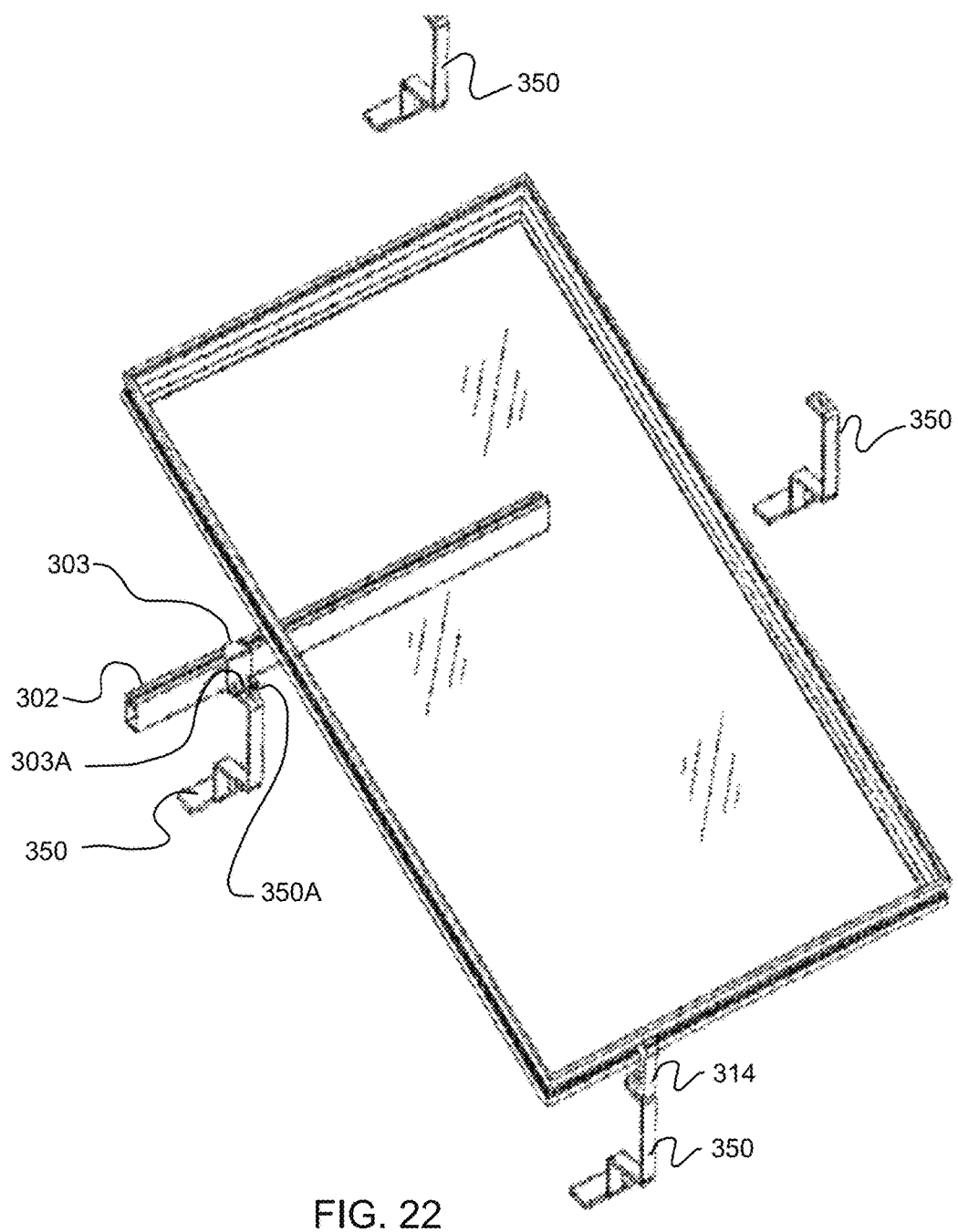
FIG. 22 is a perspective view of a PV module, spanner bar, and tile hooks.

In FIG. 22, four typical tile hooks 350 are shown mounted to a rooftop surface. One familiar with the art may recognize that other tile roof mounting hardware besides tile hooks could be used for the same function. A frame mount component 314 that allows for a direct attachment to tile hooks through use of standard fasteners such as nuts, bolts washers and the like may be installed on the first row of tile hooks 350. FIG. 22 also shows the attachment of spanner bar 302 to tile hook 350 through the use of bar clamp 303.

Figure 23:
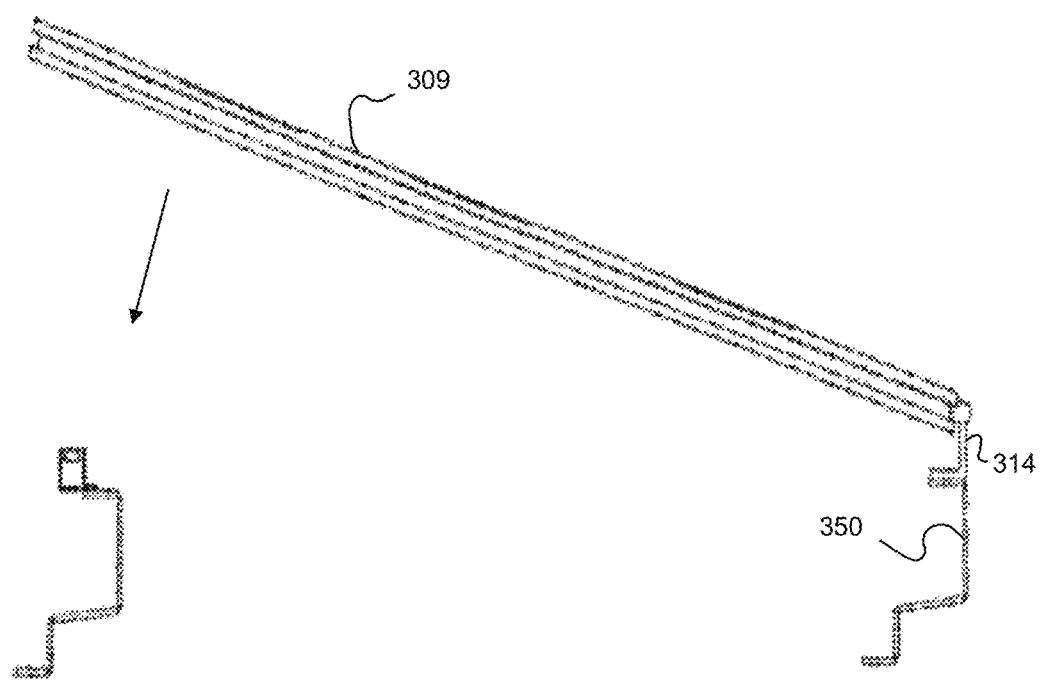
FIG. 23 is a side view of a PV module and tile hooks.

FIG. 23 shows a method of installing PV module 309 in its desired location upon a rooftop as by a pivot-fit, drop in action as discussed above. This method allows for rapid installation that does not require the use of tools, therefore saving installation time.

Figure 24:
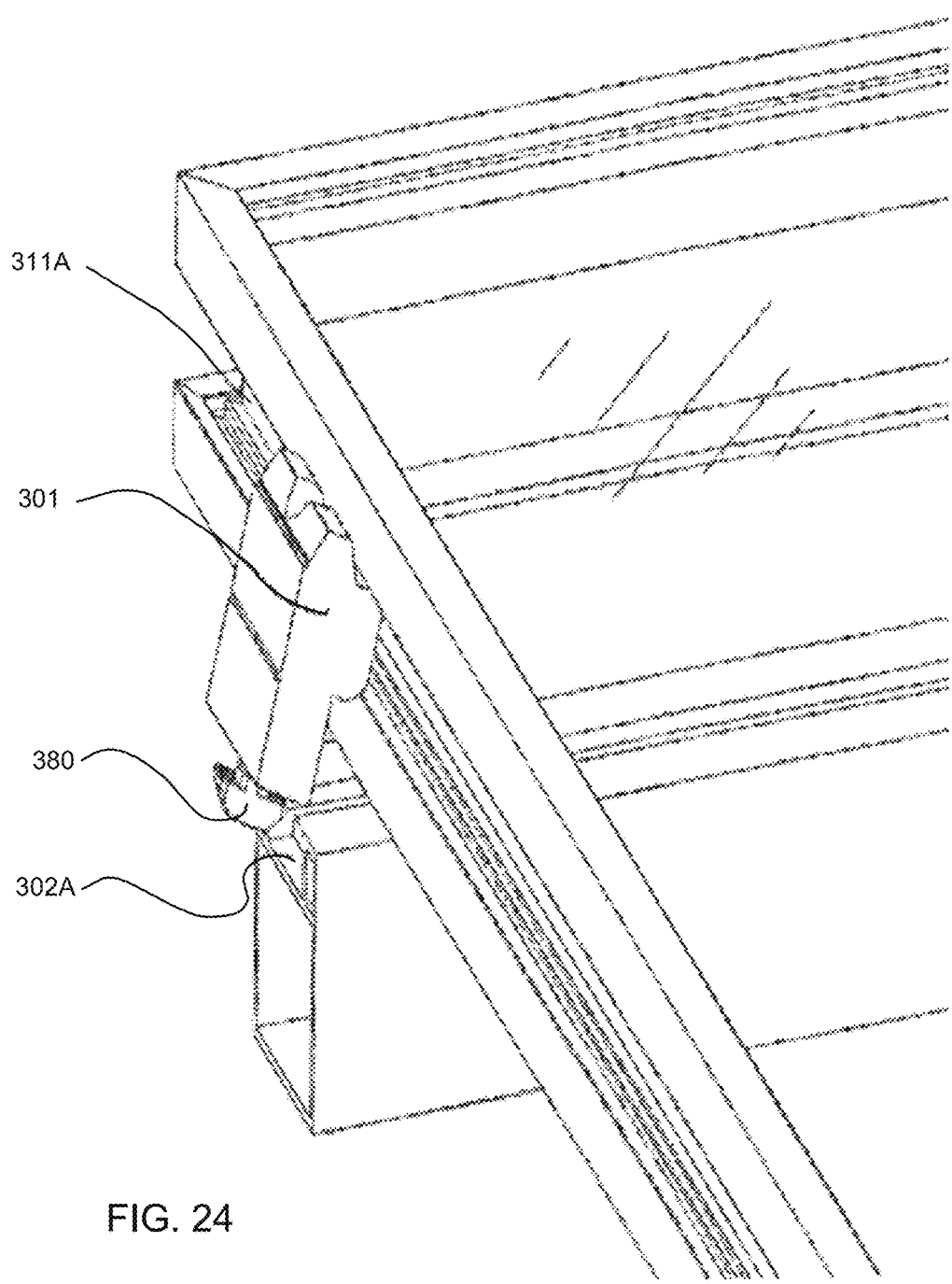
FIG. 24 is an enlarged perspective view of a portion of a PV module and spanner bar.

FIG. 24 shows spanner bar coupling 301 inserting into frame groove 311A. Also depicted is the alignment of cam nut 307 with spanner groove 302A. Once spanner bar coupling 301 has been rotationally engaged frame groove 311A, nut 380 may be secured as described above.

Figure 25:
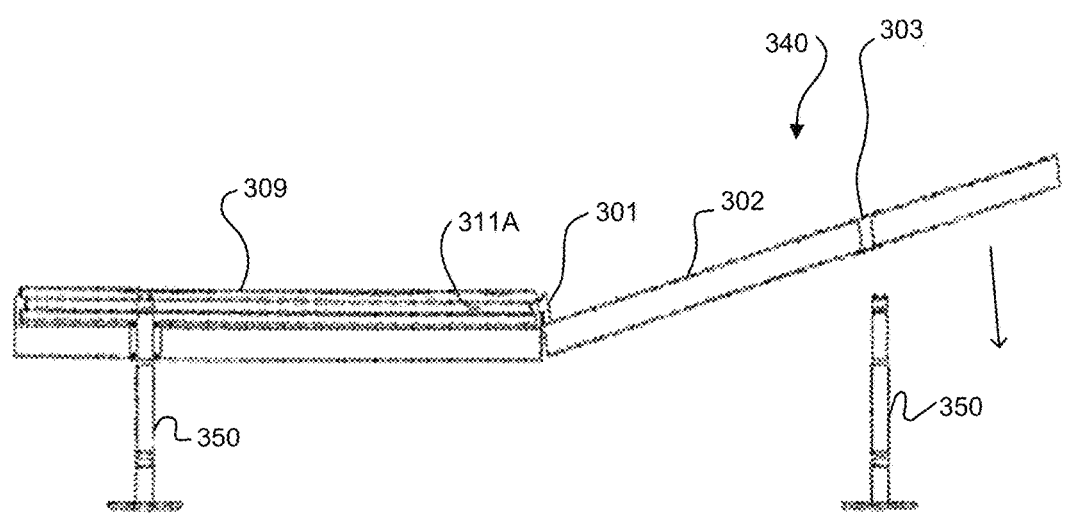
FIG. 25 is a side view of a PV module, spanner bars, and tile hooks.
Figure 26:
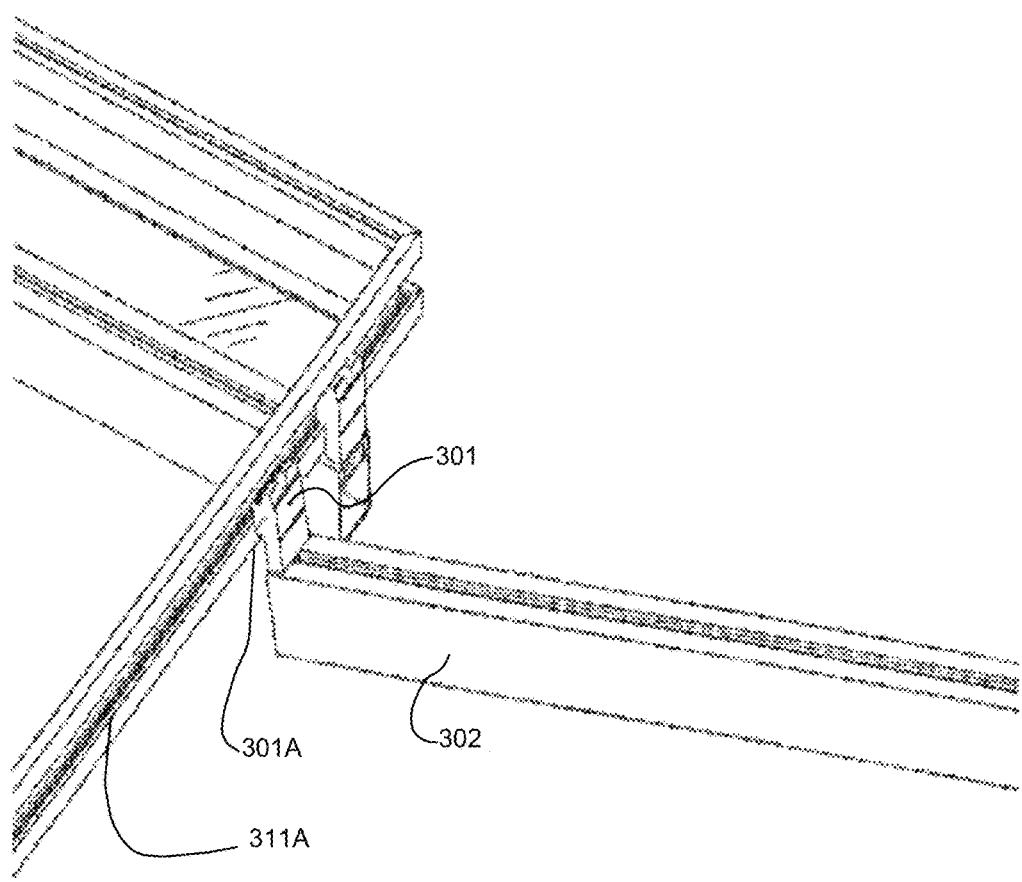
FIG. 26 is an enlarged perspective view of a portion of a PV module and spanner bars.
Figure 27:
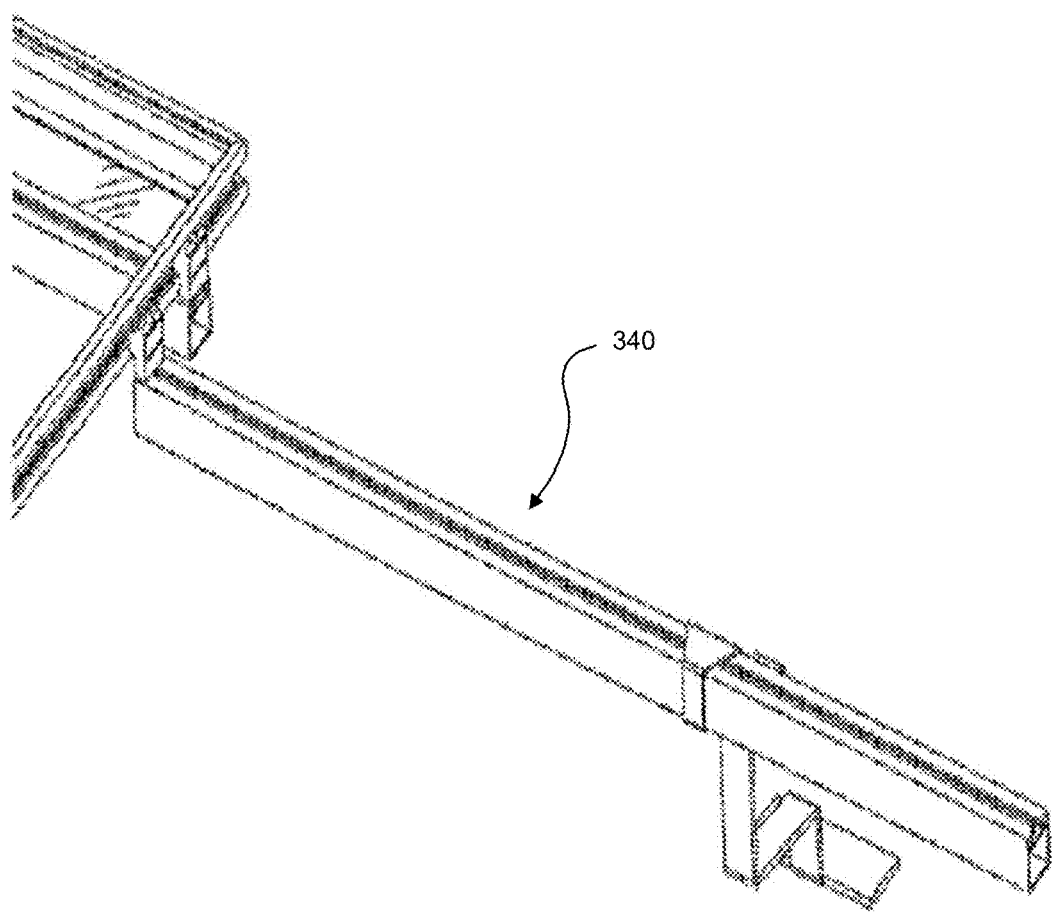
FIG. 27 is an enlarged perspective view of a portion of a PV module and spanner bars and a tile hook

FIGS. 25 through 27 show how additional spanner bar assemblies 340 may continue to be connected once the first PV module 309 has been installed.

FIG. 25 depicts spanner bar assembly 340 being installed as by connection to frame groove 311A of PV module 309. This connection may be accomplished via a drop-in, pivot-fit action and serves to lengthen the run of structural material, which spans between tile hooks 350.

FIG. 26 shows a close up view of geometrically compatible part feature 301A of spanner bar coupling 301 pivoting into frame groove 311A in the direction of the arrow.

FIG. 27 shows spanner bar assembly 340 in its installed position on a rooftop.

Figure 28:
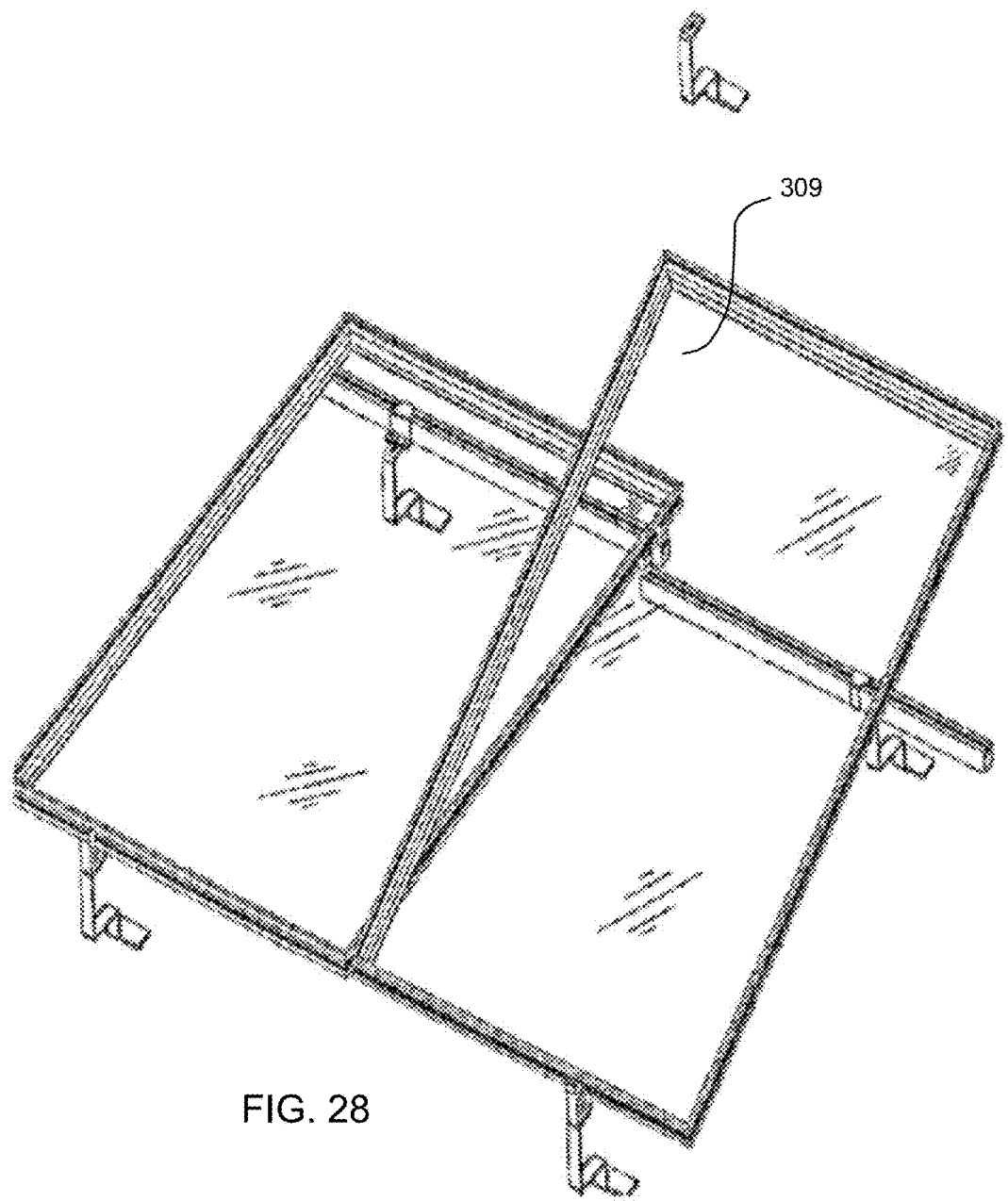
FIG. 28 is a perspective view of PV modules, spanner bars, and tile hooks.

FIG. 28 shows additional PV module 309 being installed via a drop-in, pivot-fit action as described and shown in FIG. 23 above.

Figure 29:
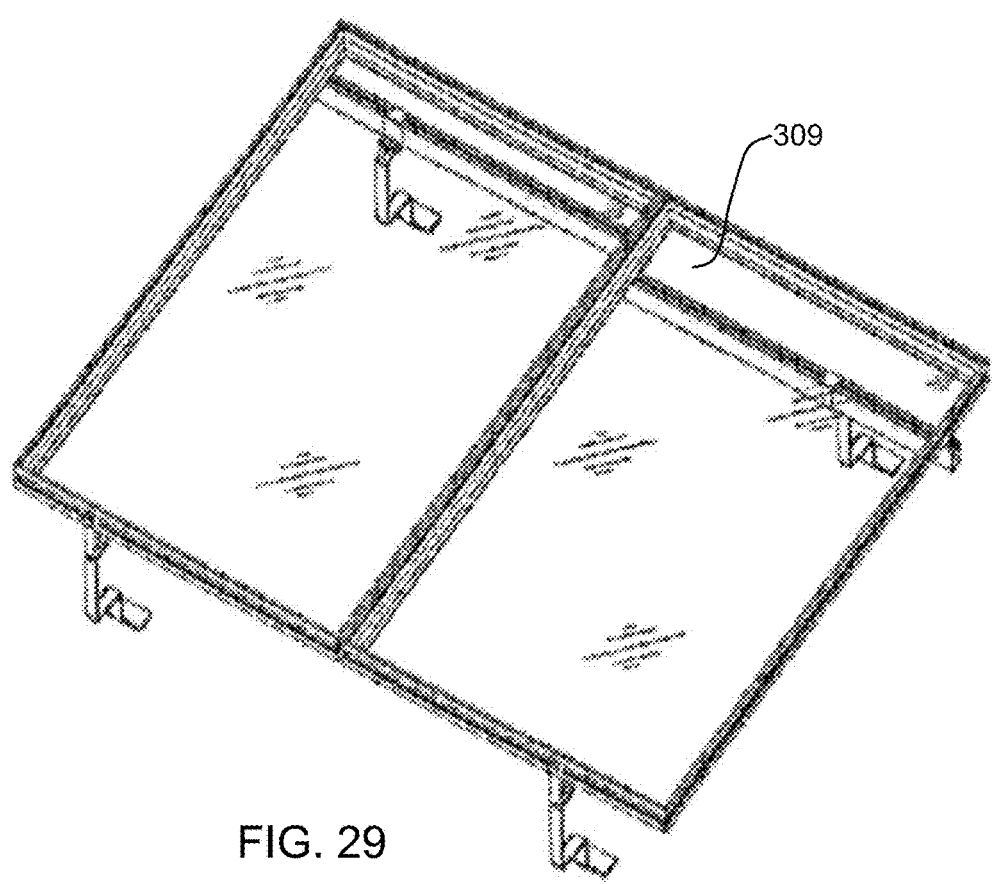
FIG. 29 is a perspective view of PV modules, spanner bars, and tile hooks.

FIG. 29 shows additional PV module 309 in its installed position on a rooftop.

Figure 30:
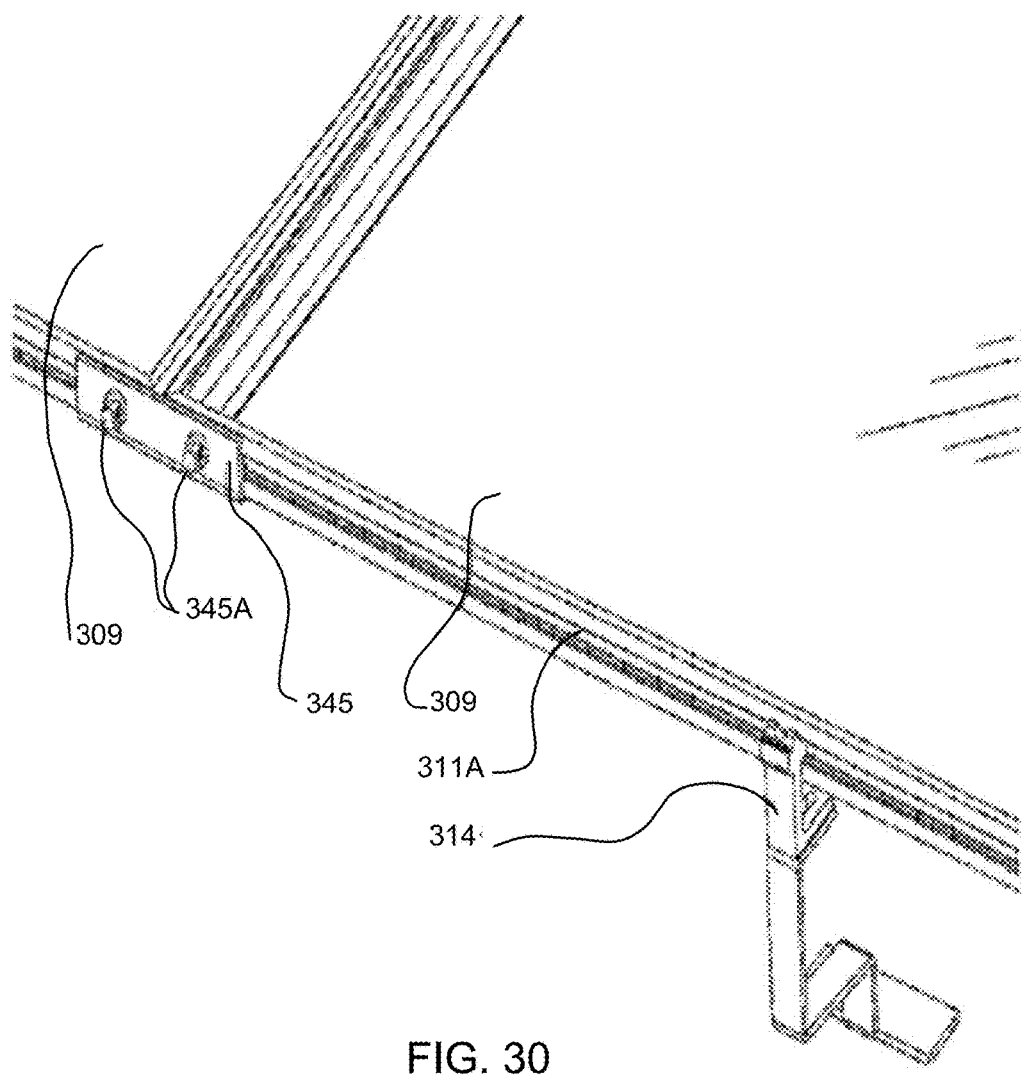
FIG. 30 is an enlarged perspective view of a portion of two PV modules and an interlock.

FIG. 30 shows installed interlock 345. Interlock 345 may be installed by inserting into frame grooves 311A and rotating frame coupling components 345A approximately 90 degrees. Interlock 345 may provide structural and/or grounding connections between PV modules 309.

Figure 31:
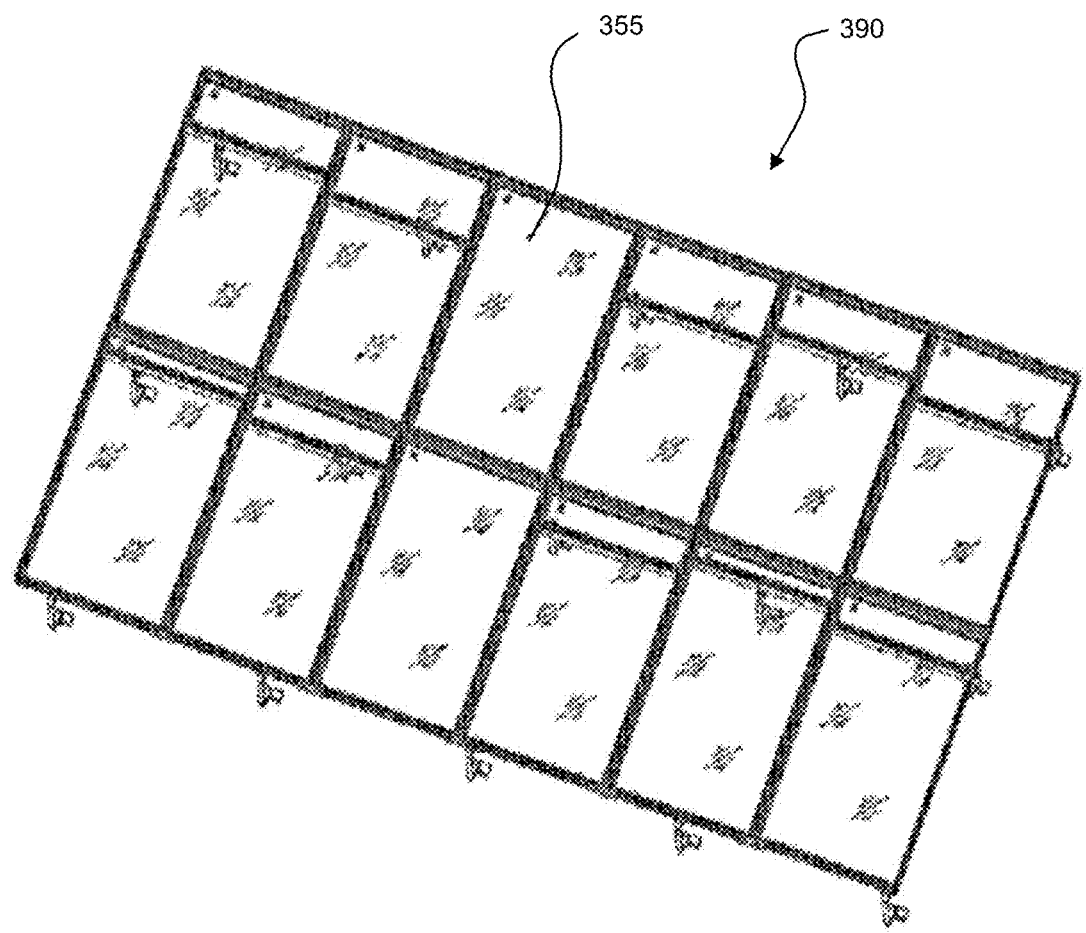
FIG. 31 is a perspective view of a PV array showing spanner bars and tile hooks.

FIG. 31 Shows a fully assembled PV array 390 (roof not shown). Note that spanner bars 302 may, in some cases, not be installed under each module. In this case interlock 345 provides the necessary structural connection between modules 309 to minimize or eliminate the need for spanner bar 302 underneath PV module 355. FIG. 31 shows an example 355 of a PV module 309 that does not have a spanner bar 302 underneath it.

Figure 32:
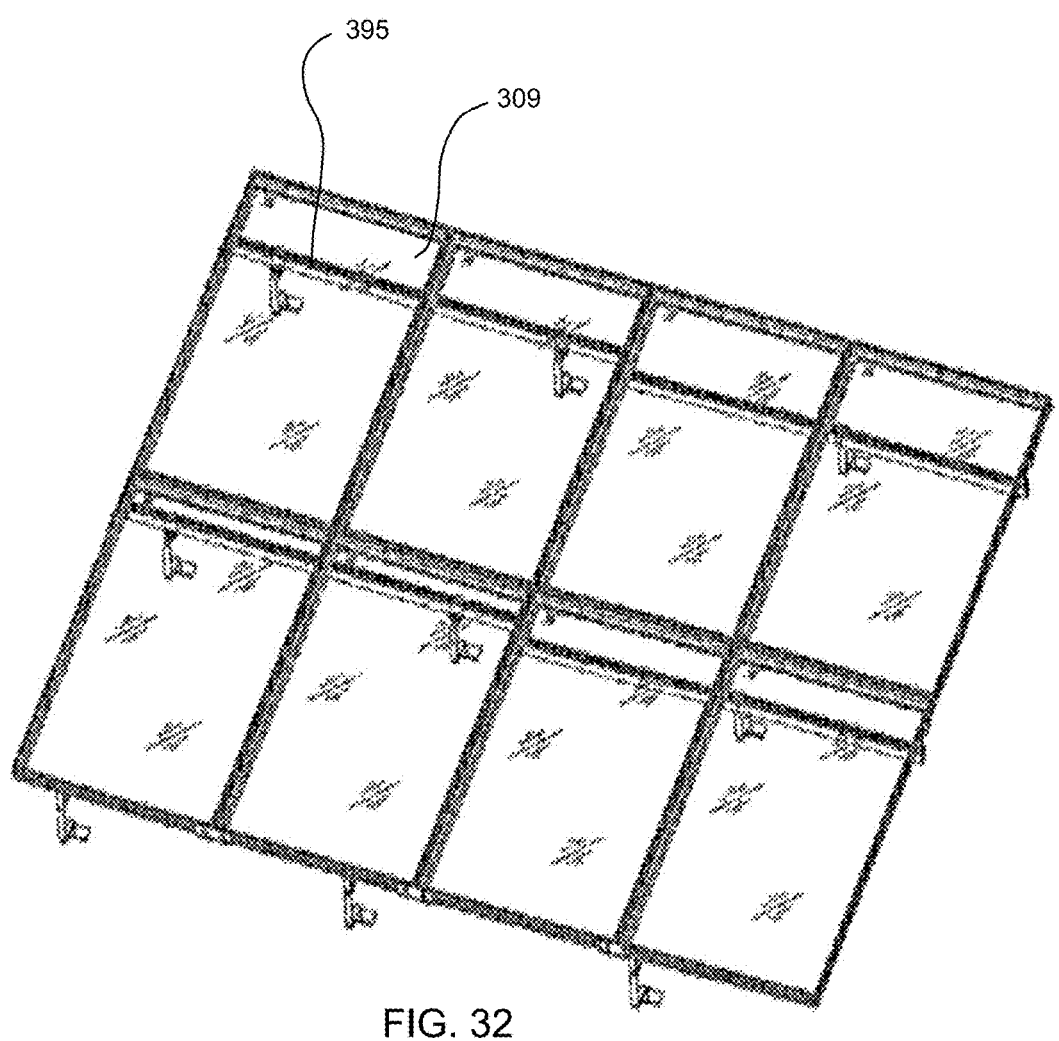
FIG. 32 is a perspective view of a PV array showing spanner bars and tile hooks.
Figure 33:
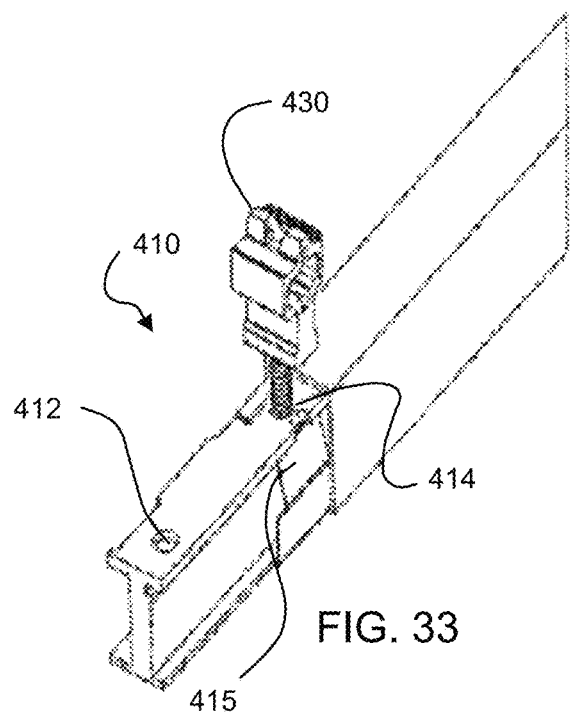
FIG. 33 is a perspective view of a coupling.
Figure 35:
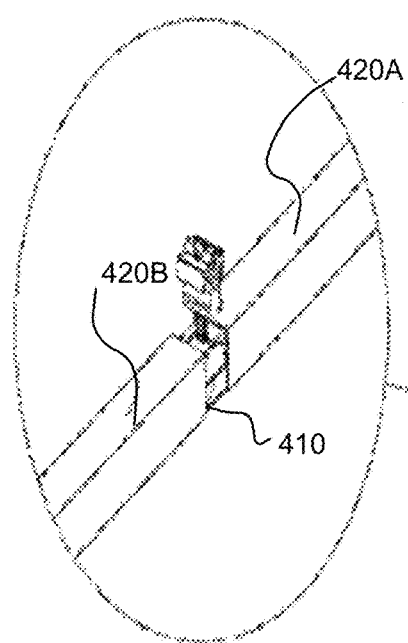
FIG. 35 is an enlarged view of a portion of FIG. 34.
Figure 34:
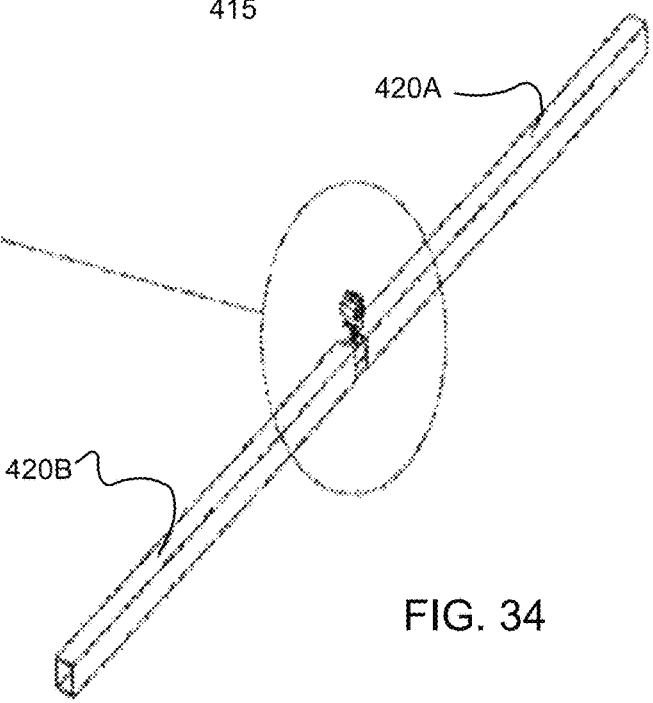
FIG. 34 is a perspective view of two spanner bars and a coupling.

FIG. 32 shows an alternate embodiment where spanner bars 302 are replaced by spanner bars 395 which span two modules 309 instead of one module 309.

In other embodiments, spanner bars 302 may be run vertically instead of horizontally on a roof and in still other embodiments PV modules 309 may be oriented in landscape orientation, or other orientation, instead of portrait as shown.

FIGS. 33-47 show additional embodiments. FIGS. 33-37 show an alternate double male coupling such as double male coupling 410. Double male coupling may couple spanner bars 420A and 420B and may provide tapped holes 412, 414 for connection to a double tongue coupling 430. Spring clip 415 may provide retention and grounding between components and may be secured to spanner bar 420A.

Figures 42, 43, 44:
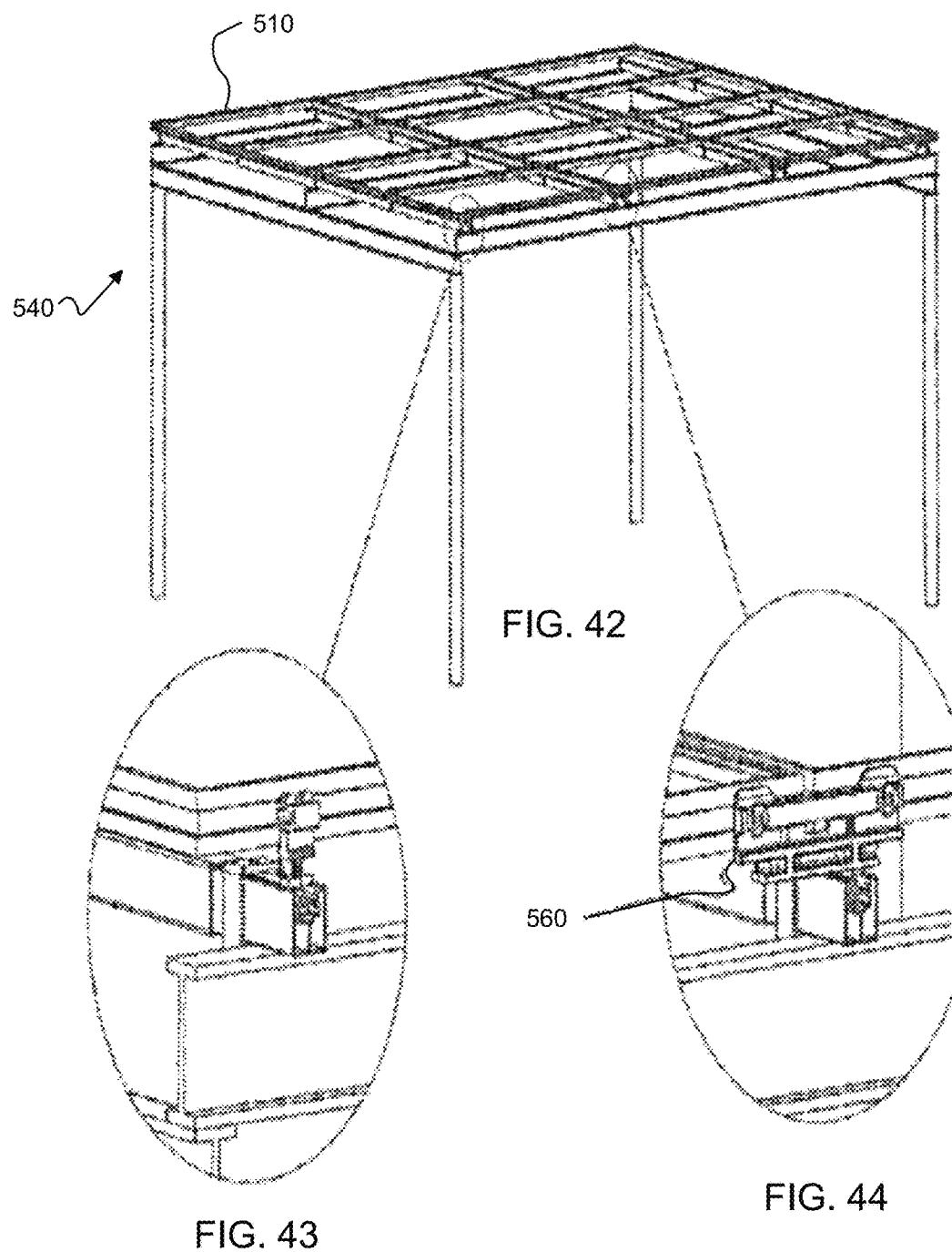
FIG. 42 is a perspective view of a PV array and a ground mount structure.
FIG. 43 is an enlargement of a portion of FIG. 42.
FIG. 44 is an enlargement of a portion of FIG. 42.

FIGS. 38-44 an embodiment where a double male connector such as double male connector 510 comprises a channel-shaped member 525 for coupling adjacent spanner bars 520A, 520B and for connecting to double male PV module coupling 514. FIGS. 42-44 show an embodiment where double male module couplings 514 interlock PV modules 510 on a ground mount structure 540 and connect to double male connectors 525 which link to spanner bars 520A, 520B. Spanner bars 520A, 520B connect to discrete attachment points on mounting structure 540. Interlocks 560 may comprise connections to double male connectors 525 in alternate embodiments instead of double tongue couplings 514.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions, and sub-combinations as are within their true spirit and scope.

What is claimed is:

1. A photovoltaic (PV) module mounting system, comprising:
   a first section of rail;
   a second section of rail;
   a splicing connector splicing an end of the first section of rail to an end of the second section of rail; and
   a PV module connector adapted to support a PV module above the splicing connector, the PV module connector comprising a base connector portion having a rotating foot that fits into a groove formed in the splicing connector, wherein the rotating foot fits into the groove in a first position and the rotating foot locks into the groove in a second position.

2. The PV module mounting system as recited in claim 1, wherein the splicing connector comprises a spring clip that provides retention and grounding between the splicing connector and the first section of rail.

3. The PV module mounting system as recited in claim 1, wherein the PV module connector is a double male PV module coupling configured to support two adjacent PV modules.

4. The PV module mounting system as recited in claim 1, wherein the groove formed in the splicing connector extends across a length of the splicing connector.

5. The PV module mounting system as recited in claim 4, wherein a first end of the splicing connector is disposed within an interior volume defined by the first section of rail and a second end of the splicing connector is disposed within an interior volume defined by the second section of rail.

6. The PV module mounting system as recited in claim 1, wherein the PV module connector comprises an interlock configured to engage a first side of a first PV module and a second side of a second PV module.

7. A photovoltaic (PV) module assembly, comprising:
a first rail;
a second rail;
a PV module;
a splicing connector splicing an end of the first rail to an end of the second rail; and
a PV module connector supporting the PV module above the splicing connector, a first end of the PV module connector coupled directly to the splicing connector and a second end of the PV module connector coupled to the PV module.

8. The PV module assembly as recited in claim 7, wherein the first and second rails define first and second respective interior volumes and wherein a first portion of the splicing connector is disposed within the first interior volume and a second portion of the splicing connector is disposed within the second interior volume.

9. The PV module assembly as recited in claim 7, further comprising a spring clip wrapped around the splicing connector and forming a grounding path between the splicing connector and one of the first rail and the second rail.

10. The PV module assembly as recited in claim 7, wherein the splicing connector includes a first opening for receiving a threaded stud of the PV module connector and a second opening for receiving a threaded stud of another PV module connector.

11. The PV module assembly as recited in claim 7, wherein the first rail comprises a hollow tube having a rectangular cross-sectional geometry.

12. The PV module assembly as recited in claim 11, wherein the splicing connector has a rectangular cross-sectional geometry and fits within the hollow tube.

13. The PV module assembly as recited in claim 7, wherein the splicing connector defines a channel and the PV module connector is coupled directly to the splicing connector by engaging the channel.

14. The PV module assembly as recited in claim 13, wherein the first end of the PV module connector has a size and shape in accordance with the size and shape of the channel defined by the splicing connector.

15. A photovoltaic (PV) module mounting system, comprising:
a first section of rail;
a second section of rail;
a splicing connector splicing an end of the first section of rail to an end of the second section of rail; and
a PV module connector adapted to support a PV module above the splicing connector, the PV module connector comprising a threaded stud engaged within a tapped hole defined by the splicing connector.

16. The PV module mounting system as recited in claim 15, wherein the PV module connector is configured to support both a first PV module and a second PV module adjacent to the first PV module.

17. The PV module mounting system as recited in claim 15, further comprising a spring clip disposed between the splicing connector and the first section of rail, the spring clip providing retention and grounding between the splicing connector and the first section of rail.

18. The PV module mounting system as recited in claim 15, wherein the PV module connector is a first PV module connector and the PV module mounting system further comprises a second PV module connector engaged within another tapped hole defined by the splicing connector.

19. The PV module mounting system as recited in claim 15, wherein the first and second sections of rail are coupled to discrete locations on a PV ground mount structure.

20. The PV module mounting system as recited in claim 15, wherein a first end of the splicing connector is disposed within a first interior volume defined by the first section of rail and a second end of the splicing connector is disposed within a second interior volume defined by the second section of rail.

* * * * *

UNITED STATES PATENT AND TRADEMARK OFFICE
CERTIFICATE OF CORRECTION

PATENT NO. : 10,309,690 B2
APPLICATION NO. : 15/866116
DATED : June 4, 2019
INVENTOR(S) : Jack Raymond West, David Youmans and Brian Atchley Page 1 of 1

It is certified that error appears in the above-identified patent and that said Letters Patent is hereby corrected as shown below:

On the Title Page

Item [73], delete "Apple Inc., Cupertino, CA (US)" and insert --SolarCity Corporation, San Mateo, CA (US)--

Signed and Sealed this
Second Day of July, 2019

Andrei Iancu
*Director of the United States Patent and Trademark Office*